United States Patent [19]
Fukuoka et al.

[11] Patent Number: 5,253,035
[45] Date of Patent: Oct. 12, 1993

[54] AUTOMATIC OPTICAL MEASURING APPARATUS FOR OPTICAL FIBERS

[75] Inventors: Satoshi Fukuoka; Shizuka Yamaguchi; Koji Sasaki; Tsuyoshi Fumeno, all of Ichihara, Japan

[73] Assignee: The Furukawa Electric Co., Ltd., Tokyo, Japan

[21] Appl. No.: 866,801

[22] Filed: Apr. 8, 1992

[30] Foreign Application Priority Data

| Apr. 12, 1991 | [JP] | Japan | 3-080156 |
| Apr. 12, 1991 | [JP] | Japan | 3-080157 |
| Jun. 28, 1991 | [JP] | Japan | 3-158643 |
| Jul. 18, 1991 | [JP] | Japan | 3-177930 |

[51] Int. Cl.$^5$ .......................... G01N 21/84
[52] U.S. Cl. .......................... 356/73.1
[58] Field of Search .......................... 356/73.1

[56] References Cited

U.S. PATENT DOCUMENTS 4,676,635 6/1987 Sakamoto et al. .................. 356/73.1

OTHER PUBLICATIONS

"Fiber Optic Cables", Fundamentals Cable Technology Installation Practice; by Mahike et al, pp. 11, 56–59.

Primary Examiner—Vincent P. McGraw
Attorney, Agent, or Firm—Frishauf, Holtz, Goodman & Woodward

[57] ABSTRACT

An automatic optical measuring apparatus for optical fibers which is designed to automatically perform a series of steps from processing tips to optical measurement of a plurality of jacketed optical fibers each comprising at least one optical fiber provided with a jacket. The automatic optical measuring apparatus is equipped with first through third array units wherein a plurality of first through third holders are arranged; first through third tip processing units for processing the ends of the individual optical fibers; first and second optical measuring units; first and second connecting units for connecting each end of the jacketed optical fiber to the optical measuring apparatus and a light source; first through third carrying units which carry the first through third holders; a haul-in unit which hauls in and cuts a specified length of the jacketed optical fiber held in the second holder at the end on the first holder; a hand-over unit which hands over the cut end of the jacketed optical fiber on the second holder onto the third holder; and a controlling unit which controls the operation of each of the aforementioned component units.

10 Claims, 40 Drawing Sheets

AUTOMATIC OPTICAL MEASURING APPARATUS FOR OPTICAL FIBERS

BACKGROUND OF THE INVENTION

1. Field of the Invention

The present invention relates to an automatic optical measuring apparatus which is designed to automatically process tips of an optical fiber held in a holder, connect the optical fiber to a measuring system which performs optical measurement of the optical fiber, and carry out optical measurement.

2. Description of Related Art

Conventionally, when performing optical measurement, e.g., measurement of a transmission loss of a jacketed optical fiber comprising at least one optical fiber provided with a jacket, the jacketed optical fiber to be subjected to the measurement is first held in a holder, then a tip processing such as a jacket removing, cleaning, and cutting is performed manually on the jacketed optical fiber. After that, the holder is set on a specified butting device, the tip of the optical fiber is butt-connected to a measuring system through a dummy fiber by the butting device, and the optical measurement such as the measurement of a transmission loss is performed.

There are, for example, the cutback method and the backscattering method as known optical measurement methods for optical fibers.

In the cutback method, one end of the optical fiber to be measured is butt-connected to a light source of measuring light via a dummy fiber, then an output $P_1$ of the measuring light emitted from the other end of the optical fiber to be measured is measured using an optical measuring means such as a power meter.

Next, the optical fiber to be measured is cut in the vicinity of a point of connection to the dummy fiber to separate it into a short optical fiber remaining on the dummy fiber and a long optical fiber remaining on the optical measuring means, and an output $P_2$ of the measuring light emitted through the cut section of the short optical fiber on the dummy fiber is measured again using the optical measuring means.

In the subsequent step, $10 \cdot \log(P_1/P_2)$ is calculated based on the two measured values $P_1$ and $P_2$, and a transmission loss (dB/km) in the longer optical fiber is determined by dividing the calculated value $10 \cdot \log(P_1/P_2)$ by the length of the long optical fiber that has remained after the cutoff.

The backscattering method is a measuring method which utilizes a phenomenon in which the measuring light entering the optical fiber to be measured returns due to the Reyleigh scattering. An OTDR (optical time domain reflectometer) is in practical use as a device for carrying out the method. In the OTDR, the light source of the measuring light is connected with the optical fiber to be measured via a directional coupler, and a display unit for displaying the intensity of scattered light is also connected to the directional coupler.

The method is advantageous in that it makes it possible to determine a local transmission loss or reflection related to the optical fiber to be measured. More specifically, when the measuring light is emitted from the light source into one end of the optical fiber, the transmission loss can be determined from scattered light which is returned due to back scatter among the light which is scattered while it is transmitted through the optical fiber, and also a place to which the scattered light returns can be identified from a time delay of the scattered light.

When performing such optical measurement of the optical fiber, in a series of steps from holding the optical fiber in the holder to the optical measurement, the holder holding the optical fiber must be handed manually from a step to the subsequent step. For this reason, when performing optical measurement of each optical fiber of an optical fiber cable or the like comprising many optical fibers, the work unavoidably becomes extremely complicated and the measurement takes much time because the series of steps is repeated for each single optical fiber.

SUMMARY OF THE INVENTION

An object of the present invention is to provide an automatic optical measuring apparatus for optical fibers which permits automatic processing of the tips of an optical fiber, connection to a measuring system, and optical measurement without human aid.

To fulfill the above-mentioned object, the automatic optical measuring apparatus for optical fibers is equipped with the following components to perform the series of steps from the processing of the tips to the optical measurement of a plurality of jacketed optical fibers each comprising at least one optical fiber provided with a jacket: the first and second array units wherein a plurality of the first and second holders are arranged, each holder holding the end of the jacketed optical fiber to be subjected to optical measurement in a manner such that the jacketed optical fiber protrudes by a specified length; the third array unit wherein a plurality of the third holders are arranged; the first through third tip processing units for processing the ends of said individual jacketed optical fibers; the first optical measuring unit to which one end of the jacketed optical fiber, held by the first holder, with its tip processed is connected; the first connecting unit for connecting the one end of said jacketed optical fiber held by the first holder to the optical measuring apparatus; the second connecting unit which connects the other end of said jacketed optical fiber, held by the second holder, with its tip processed to a light source; the first carrying unit which carries said first holder from said first array unit to said first tip processing unit, the first optical measuring unit, and the first connecting unit, then returns it to said first array unit; a haul-in unit which hauls in and cuts a specified length of the jacketed optical fiber held in said second holder on the first holder side; the second carrying unit which carries said second holder from said second array unit to said second tip processing unit, and the second connecting unit, then returns it to said second array unit; a hand-over unit which hands over the cut end of said jacketed optical fiber on the second holder side, which was cut by said haul-in unit, to said third holder, with a specified length of the cut end jutting out; the second optical measuring unit to which the cut end of said jacketed optical fiber on said second holder side, which has been transferred onto said third holder, is connected; the third carrying unit which carries said third holder from said third array unit to said third tip processing unit and the second optical measuring unit, then returns it to said third array unit; and a controlling unit which controls the operation of each of the above-mentioned component units.

Preferably, said automatic optical measuring apparatus for optical fibers is equipped with the first through third pull-out units which pull out the jacketed optical fiber held in each first through third holder by a specified length if the end of the jacketed optical fiber processed by said each first through third tip processing unit is found defective, and said each first through third carrying unit carries said first through third holder from said individual first through third tip processing units to said each pull-out unit which pull out the jacketed optical fiber by the specified length, then carry said each holder back to the tip processing unit.

Further preferably, said first through third tip processing units are equipped with holding means for holding said holders which hold the ends of said jacketed optical fibers with the ends jutting out, jacket removing means for removing the jackets from the ends of said jacketed optical fibers by a desired length, cleaning means for cleaning the optical fibers exposed by said jacket removing means which take the jackets off of them, and cutting means for trimming said optical fibers, which have been cleaned by said cleaning means, to a specified length, in order to perform the jacket removing, cleaning, and cutting operations on said jacketed optical fibers.

Using the system configured as described above, the ends of jacketed optical fibers to be subjected to measurement can be automatically processed, and therefore, the need for human aid is eliminated, resulting in a shortened processing time.

Further preferably, said first and second connecting units are equipped with butting assemblies which have connecting grooves for inter-butting optical fibers for connection; and a pair of mounting bases, which are installed on both sides of the butting assemblies; and on one of which is mounted the holder holding a dummy fiber connected to said optical measuring apparatus or said light source, while the other of which is arranged so that it can be moved toward and away from said butting assemblies, and on which are mounted said first and second holders holding said jacketed optical fibers; the connecting units being designed so that the optical fibers of said both fibers are inter-butt for connection in the connecting grooves of said butting assemblies.

The above-mentioned configuration is advantageous in that it permits easy and quick temporary butt-connection of optical fibers.

In the automatic optical measuring apparatus for optical fibers according to the present invention, when the ends of jacketed optical fibers to be measured are held in the first and second holders with the ends jutting out by a specified length, and the holders are arranged in the first and second array units, carrying units take out the holders, which hold the ends of the jacketed optical fibers, from the array units, and carry them to the tip processing units, connecting units, optical measuring units, etc. in accordance with an operation sequence which is stored in the controlling unit in advance.

Each tip processing unit removes the jackets from the jacketed optical fibers held in the first and second holders which are carried from the array units by the carrying units, cleans the exposed optical fibers, then trims the optical fibers to the specified length.

The first connecting unit connects one end of the jacketed optical fiber held in the first holder carried by the carrying unit from the tip processing unit to the optical measuring apparatus, while the second connecting unit connects the other end of said jacketed optical fiber to the light source of the measuring light.

The haul-in unit hauls in the jacketed optical fiber on the second holder side and cuts it prior to the measurement of the jacketed optical fiber according to the cutback method.

The hand-over unit takes up the cut end of the jacketed optical fiber, which has been cut, on the second holder side, and hands it over to the third holder arranged in the third array unit.

The holders individually holding the end of the jacketed optical fiber, on which the optical measurement has been completed, are carried from the connecting units back to the corresponding array units by the carrying units.

According to the automatic optical measuring apparatus for optical fibers of the present invention, simply by setting a plurality of holders holding jacketed optical fibers, which are to be measured, in array units in advance, all steps of processing the ends of the jacketed optical fibers, carrying to the optical measuring units, connection to the optical measuring apparatus, and optical measurement can be automatically implemented continuously in parallel without human aid. This ensures great effect in that the time and labor required for the work are dramatically reduced.

The aforementioned and other objects of the present invention, characteristics, and advantages will be further clarified from the following detailed description given with reference to the accompanying drawings.

DETAILED DESCRIPTION OF THE PREFERRED EMBODIMENTS

The following describes an embodiment of the automatic optical measuring apparatus for optical fibers according to the present invention when the automatic optical measuring apparatus for optical fibers is used to perform optical measurement of optical fibers in accordance with the cutback method and the backscattering method at the same time, referring to FIG. 1 through FIG. 45.

Figure 1:
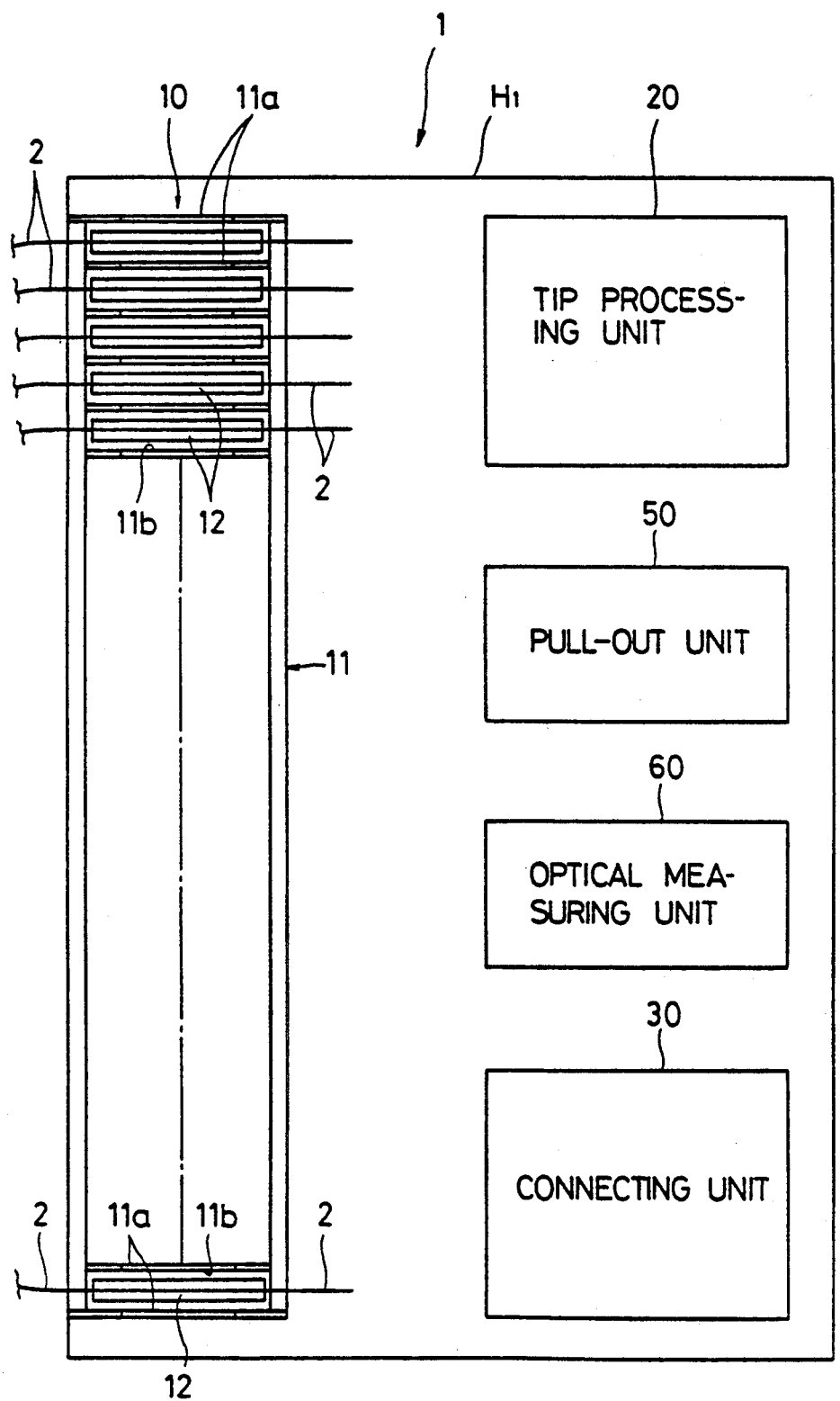
FIG. 1 shows an embodiment of the automatic optical measuring apparatus for optical fibers according to the present invention, and it is a plan view of the first housing constituting the automatic optical measuring apparatus.
Figure 2:
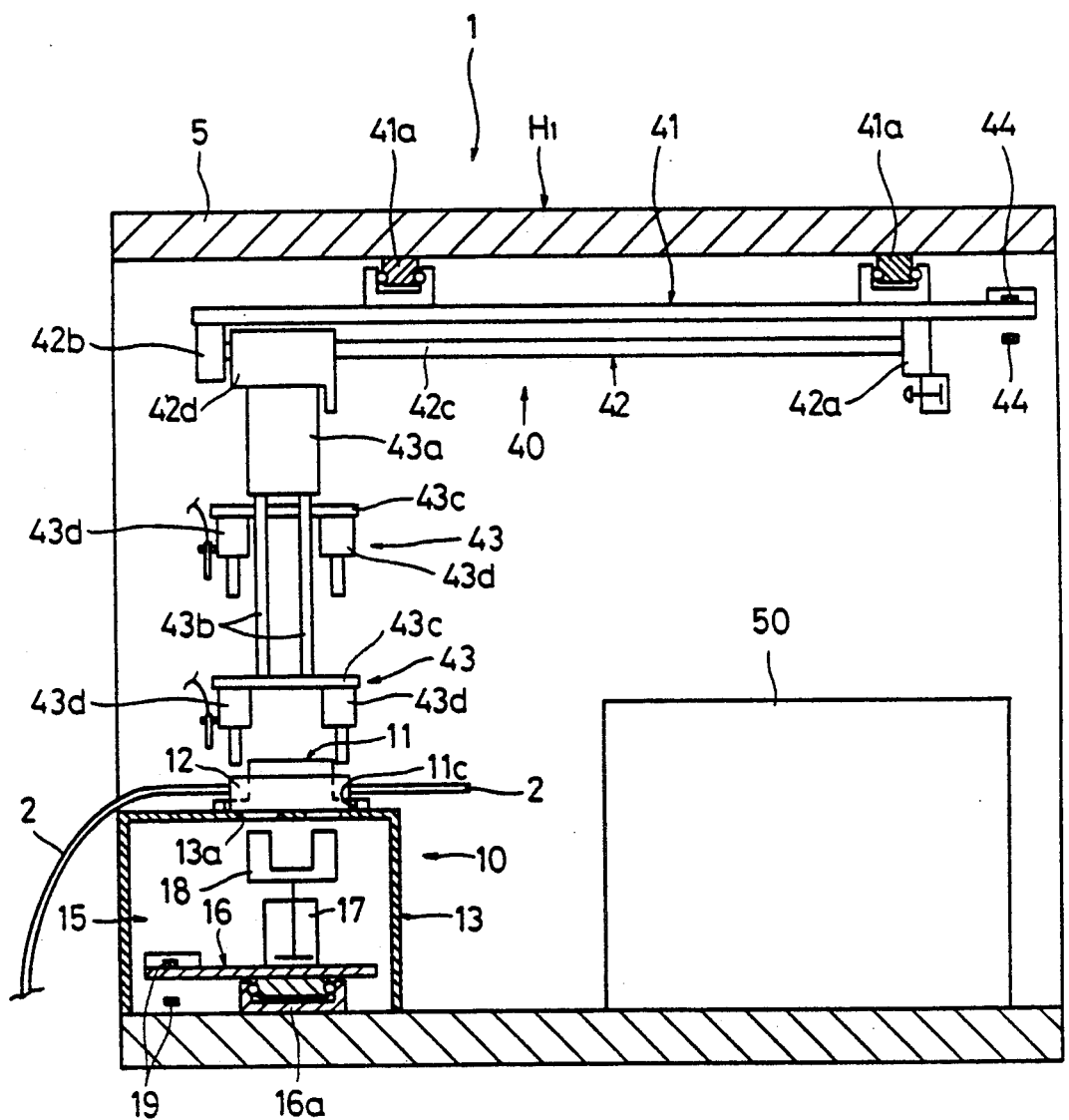
FIG. 2 is a cross-sectional view of the first housing.
Figure 3:
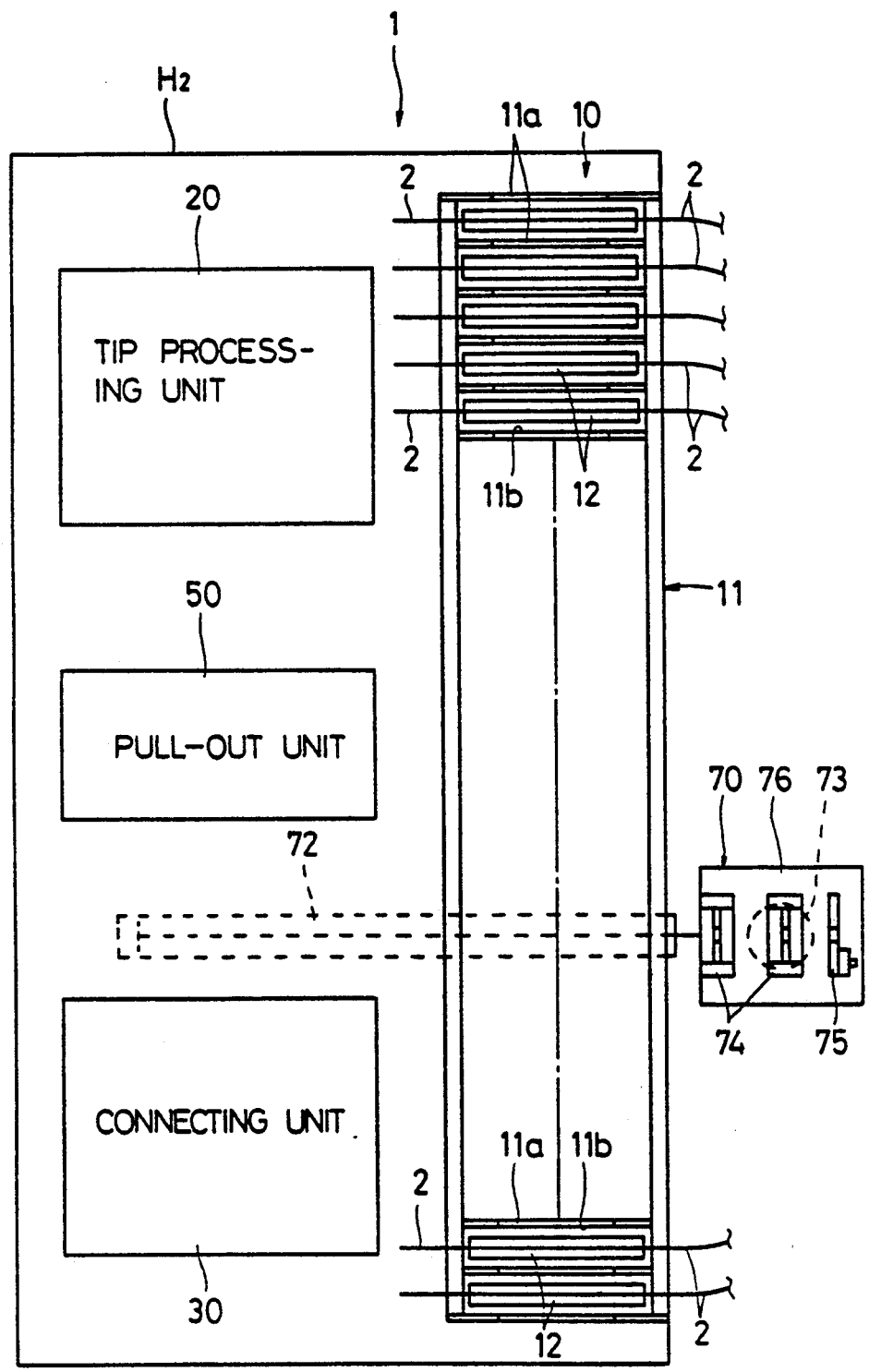
FIG. 3 is a plan view of the second housing constituting the automatic optical measuring apparatus.
Figure 4:
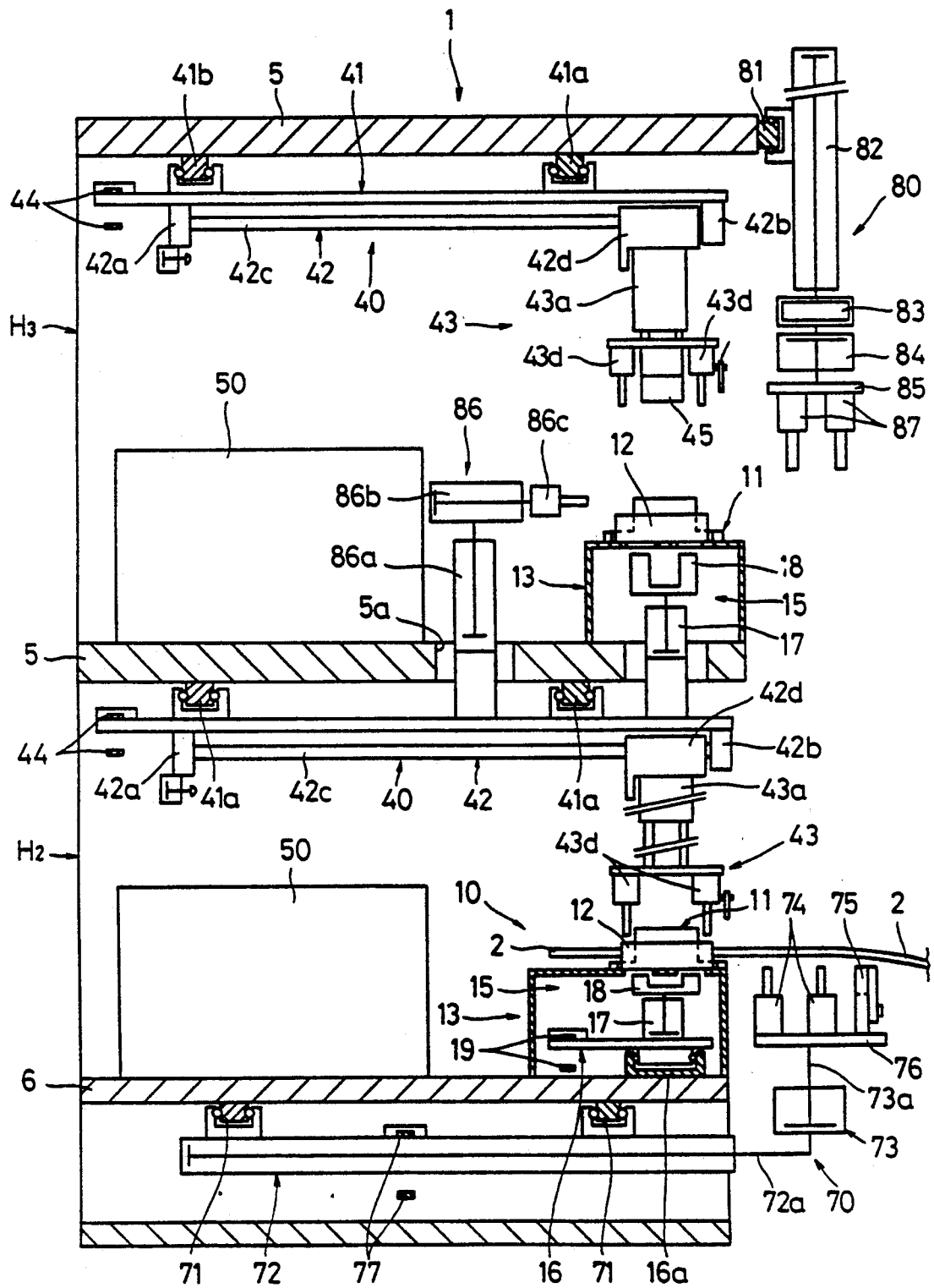
FIG. 4 is a cross-sectional view of the second housing and the third housing constituting the automatic optical measuring apparatus.
Figure 5:
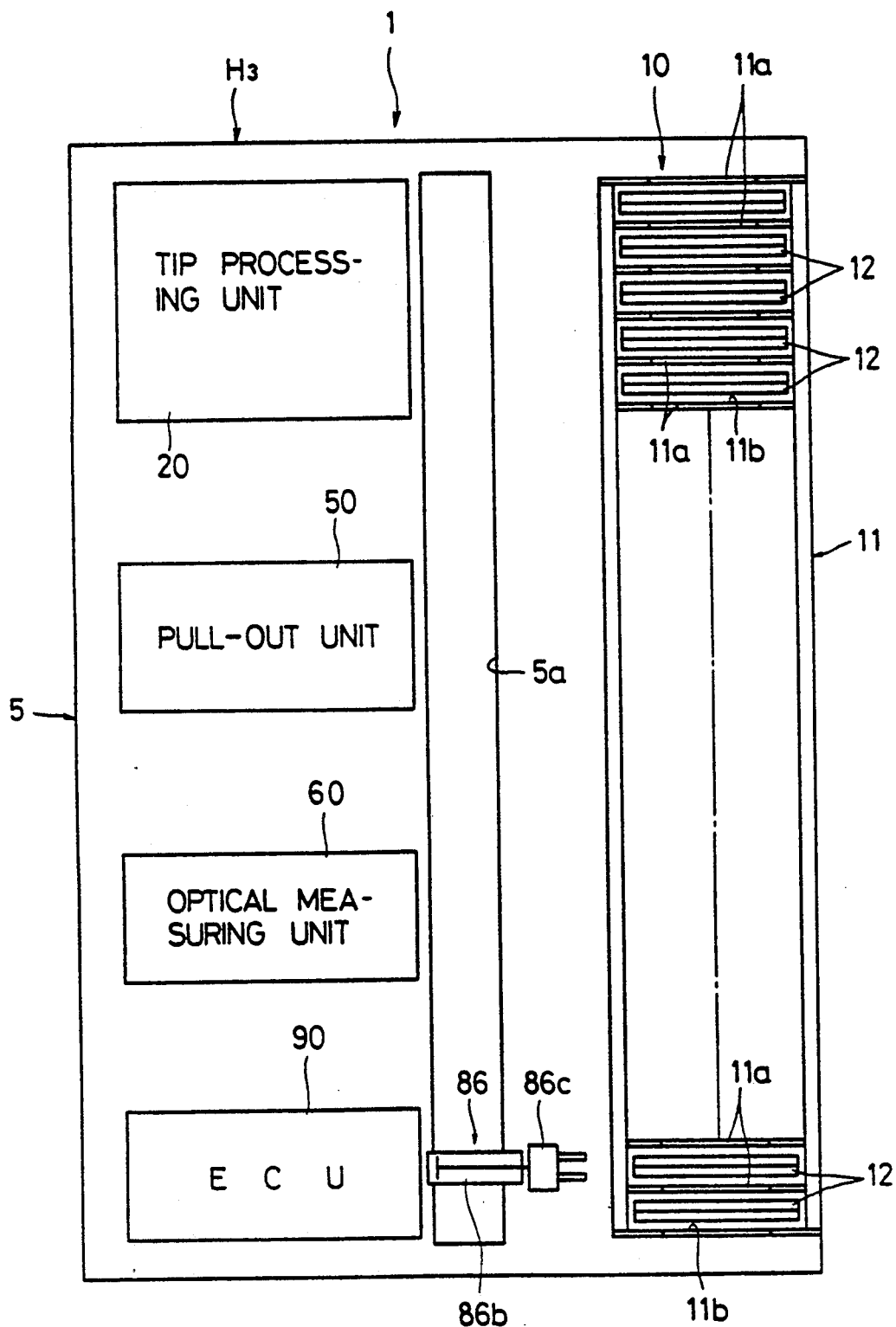
FIG. 5 is a plan view of the third housing.

An automatic optical measuring apparatus 1 has the first housing $H_1$ through the third housing $H_3$ as shown in FIG. 1 through FIG. 5. In the first housing $H_1$, as shown in FIG. 1 and FIG. 2, an array unit 10, an tip processing unit 20, a connecting unit 30, a carrying unit 40, a pull-out unit 50, and an optical measuring unit 60 are installed. In the second housing $H_2$, as shown in FIG. 3 and FIG. 4, an array unit 10, an tip processing unit 20, a connecting unit 30, a carrying unit 40, a pull-out unit 50, and a haul-in unit 70 are installed. In the third housing $H_3$, as shown in FIG. 4 and FIG. 5, an array unit 10, a tip processing unit 20, a carrying unit 40, a pull-out unit 50, an optical measuring unit 60, a hand-over unit 80, and a controlling unit 90 having an electronic controlling unit (ECU) are installed.

A brief description of each unit will now be given. The array unit 10 serves as a place where a plurality of holders 12 holding jacketed optical fibers 2 to be subjected to measurement are arranged, and the tip processing unit 20 performs tip processing operations such as removing a jacket from the end of the jacketed optical fiber 2 and cleaning the optical fiber 2a exposed. The connecting unit 30 connects one side of the jacketed optical fiber 2 to the optical measuring apparatus and connects the other side of the jacketed optical fiber 2 to a light source of the measuring light. The carrying unit 40 carries the holders 12 holding the end of the jacketed optical fiber 2 to each of the foregoing units. The pull-out unit 50 pulls out jacketed optical fibers by a specified length from the holders 12 to cut them to put them back to an unprocessed condition so that they can undergo the tip processing again if the ends of the jacketed optical fibers 2 processed by the tip processing unit 20 are found defective. The optical measuring unit 60 measures the intensity of the measuring light transmitted through the jacketed optical fibers 2. The haul-in unit 70 hauls in the jacketed optical fibers 2 by a specified length to cut them when measuring the jacketed optical fibers 2 according to the cutback method. The handover unit 80 transfers the cut ends of the jacketed optical fibers 2, that have been cut, from the second housing $H_2$ to the third housing $H_3$. The controlling unit 90 controls the operation of each of the above-mentioned units in accordance with a preset procedure.

ARRAY UNIT 10

The array unit 10 is installed on one side of the housings $H_1$ through $H_3$, and it is provided with a holder pallet 11 installed on an array box 13 which is mounted lengthwise, and a lifting means 15 installed in the array box 13.

On the holder pallet 11 are placed a plurality of holders 12 holding the jacketed optical fibers 2 to be subjected to measurement. A plurality of arrays 11b, which arrange the holders 12 lengthwise by a plurality of partitions 11a standing widthwise, are formed, and openings 11c are provided under the arrays 11b.

The holders 12 are designed to extend the ends of the jacketed optical fibers 2 by a specified length and hold the jacketed optical fibers 2 by magnetic force produced by two magnetic metallic plates linked in a hinged form. Thus, the holders 12 permit easy mechanical handling of the jacketed optical fibers 2 in the housings $H_1$ through $H_3$.

Figure 7:
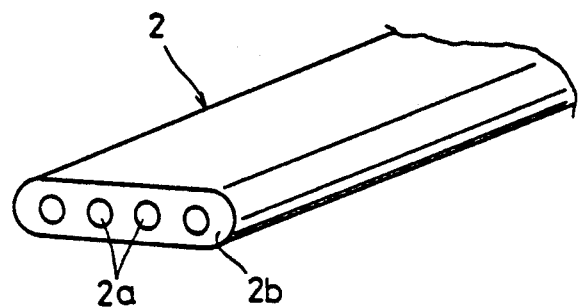
FIG. 7 is a perspective view illustrating a jacketed optical fiber to be measured before its ends are processed.

The jacketed optical fiber 2 is a 0.4 mm-thick fiber ribbon comprising, for example, a plurality of optical fibers 2a of a 125 μm diameter which are arranged in parallel and which are covered with a jacket 2b made of a synthetic resin or the like as shown FIG. 7.

The lifting means 15 is equipped with a slide table 16 installed on a slide guide 16a, a lifting cylinder 17 mounted on the table 16, and a U-shaped push-up assembly 18 which is moved up and down by the cylinder 17. The array box 13 has a plurality of openings 13a which are provided along the lengthwise in positions corresponding to the openings 11c in the holder pallet 11 and which allow the push-up assembly 18 to be inserted into the openings 11c of the holder pallet 11.

The central part of a driving belt 19 installed on a driving motor and a pulley, which are not illustrated, is fixed to one side of the slide table 16, and the table 16 is slid lengthwise by the driving belt 19. The lifting means 15 mounted on the third housing $H_3$ does not require a driving belt because the lifting cylinder 17 is mounted on a support plate 41 of the carrying unit 40.

In the array unit 10 configured as described above, when hand chucks 43d and 43d of the carrying unit 40 grip successively a plurality of holders 12 arranged on the holder pallet 11, the lifting means 15 operates according to the position of each holder 12 to be gripped, and the slide table 16 is moved by the driving belt 19. This causes the push-up assembly 18 to be moved to the position of the corresponding holder 12 and pushed up by the cylinder 17. This in turn causes the push-up assembly 18 to push up the holder 12 off the holder pallet 11 so that the hand chucks 43d and 43d can easily grip the holder 12.

TIP PROCESSING UNIT 20

The tip processing unit 20 has a so-called "three-in-one" feature, i.e., three functions in a single unit; a function for removing the jacket 2b of the jacketed optical fiber 2 which undergoes the optical measurement, a function for cleaning the surfaces of exposed optical fibers 2a, and a function for trimming the optical fibers 2a to a specified length. This tip processing unit is provided in each of the first housing $H_1$ through the third housing $H_3$. In the tip processing unit 20, laser sensors 22 and 22, a fiber holding unit (hereinafter referred to as "holding unit") 210, a jacket removing unit 220, a cleaning unit 230, and a cutting unit 240 are mounted on a foundation 21 as shown in FIG. 8 through FIG. 11. The illustrated position is its initial position before or after operation.

The laser sensors 22 and 22 are, for instance, of transmission type sensors, and they are designed so that one sensor 22 emits a laser beam, which takes the form of a belt-like parallel light flux, to the other sensor 22. The tip of the jacketed optical fiber 2 with a processed tip to be discussed later is inserted and passed through the sensors 22 and 22 to check whether the processed tip of the jacketed optical fiber 2 is good or not according to the laser beam received by the receiving sensor 22.

Figure 8:
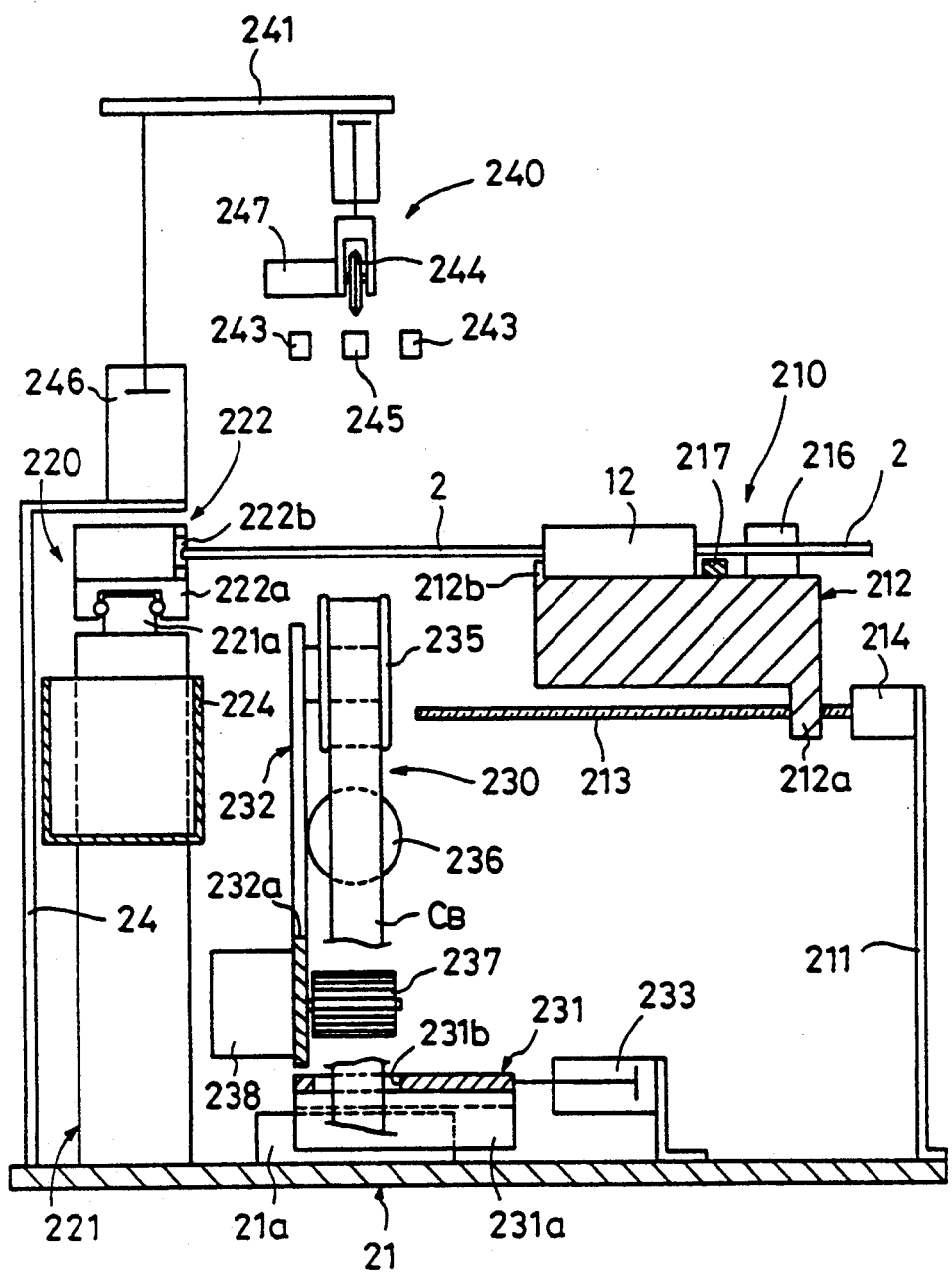
FIG. 8 is a partial cross-sectional side view of a tip processing unit, which constitutes the automatic optical measuring apparatus shown in FIG. 1, observed from the left side.
Figure 10:
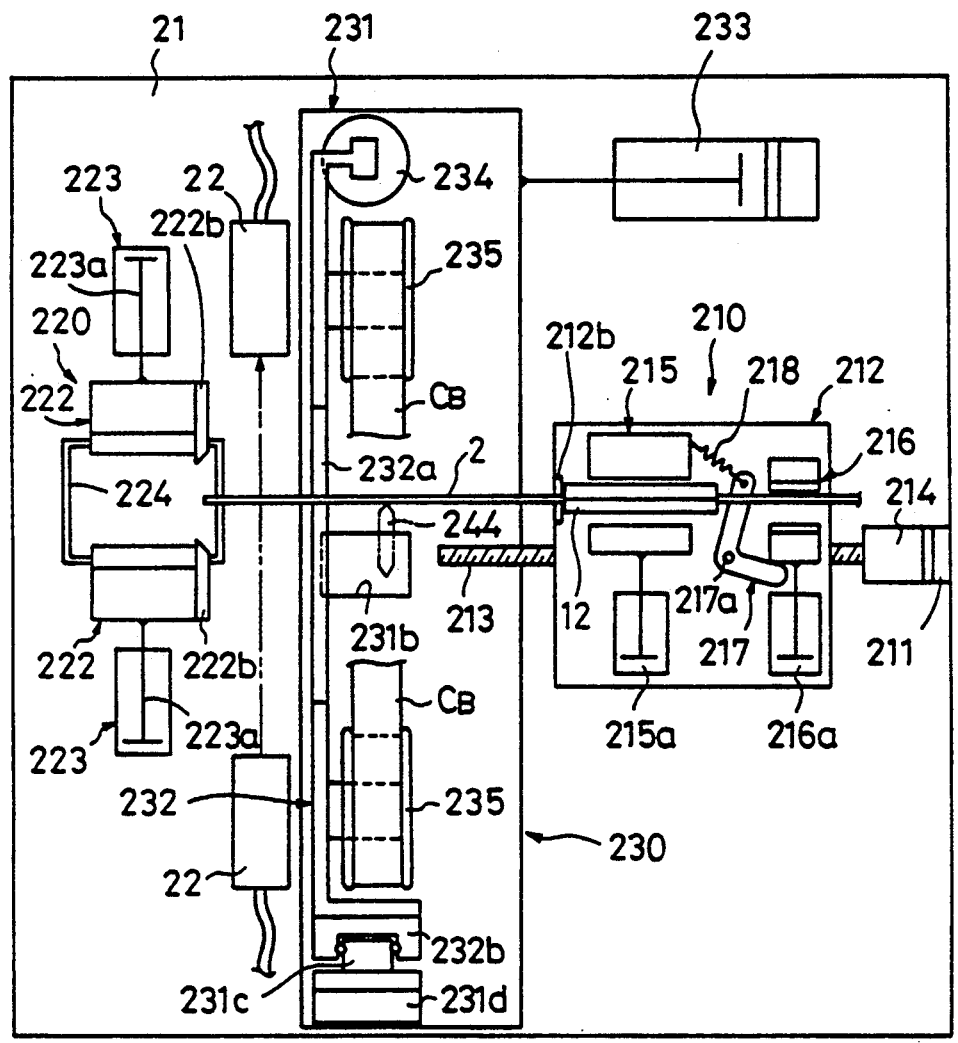
FIG. 10 is a plan view of the tip processing unit shown in FIG. 8.

As shown in FIG. 8 and FIG. 10, the holding unit 210 is mounted on the top of a support frame 211 which is provided at the center on one side of the foundation 21, and the holding unit 210 has a movable table 212, a shaft 213 which goes through a support portion 212a provided at the bottom of the table 212 and moves the table 212 toward or away from the jacket removing unit 220, and a driving motor 214 which rotates the shaft 213.

On the movable table 212 are mounted a fixing means 215 for fixing the holder 12 holding the jacketed optical fiber 2, a clamping means 216 which clamps the jacketed optical fiber 2 extending toward the rear from the holder 12, an L-shaped arm 217 which contacts the back of the holder 12 to move it forward, and a stopper 212b which contacts the front of the holder 12, which is pushed forward, to stop it.

The fixing means 215 fixes the holder 12 in a manner that releases the holder 12, and it is driven by a fixing cylinder 215a. The holder 12 is fixed by the fixing means 215 in such a way that the tip of the jacketed optical fiber 2 to be processed juts out by a specified length so that it reaches the jacket removing unit 220 as shown in FIG. 8 and FIG. 10.

The clamping means 216 firmly clamps the jacketed optical fiber 2 through a frictional piece such as rubber to prevent it from slipping off the holder 12 when the jacket removing 220 and the holding unit 210 work together to remove the jacket 2b from the tip of the jacketed optical fiber 2. The clamping means 216 is driven by a clamping cylinder 216a.

The L-shaped arm 217 is located between the fixing means 215 and the clamping means 216, and it is supported by the movable table 212 via a support shaft 217a so that it is allowed to turn at the central bending part. It is always energized toward the holder 12 by a tension spring 218 provided between itself and the fixing means 215.

Figure 9:
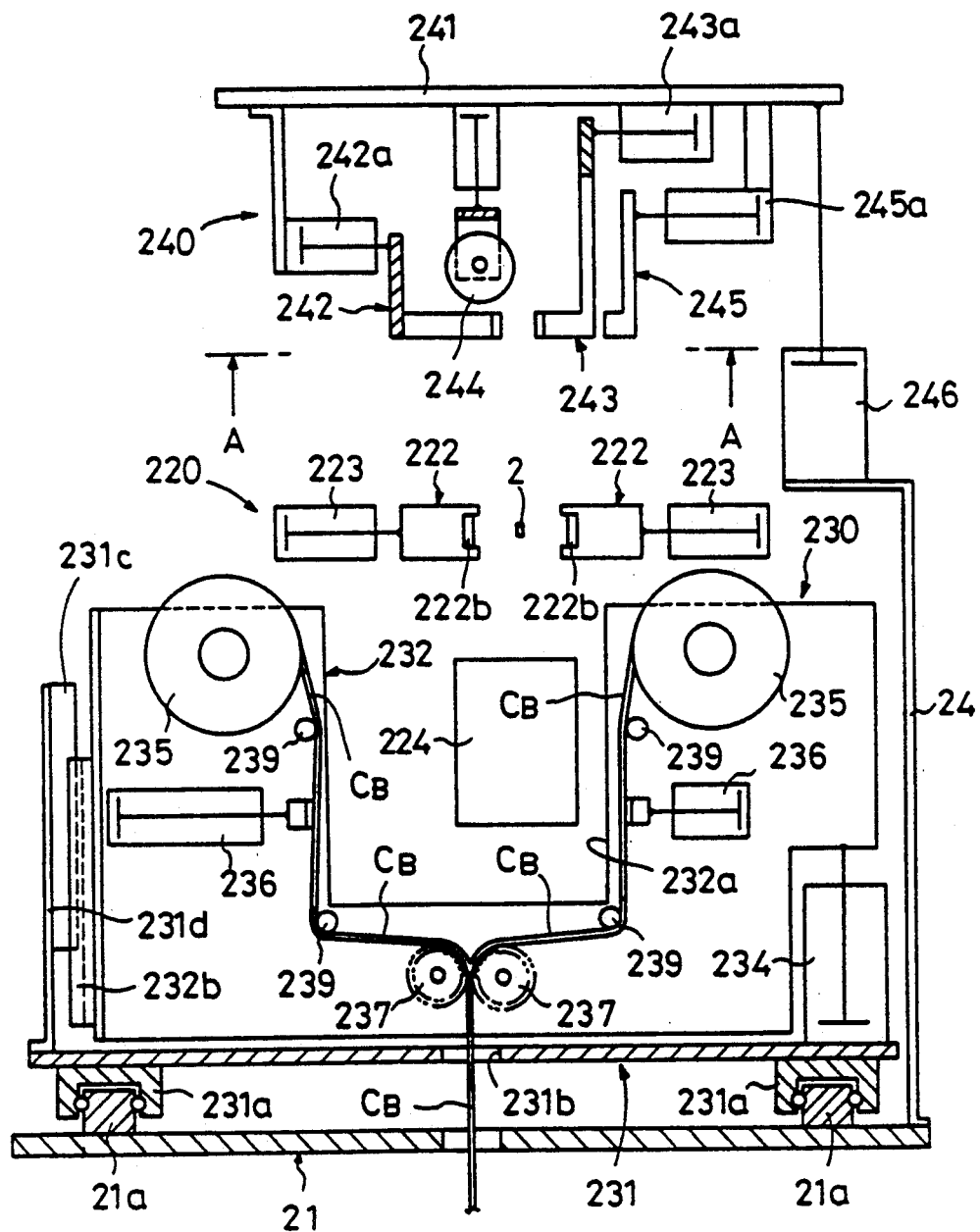
FIG. 9 is a partial, cross-sectional front view of the tip processing unit shown in FIG. 8.

The jacket removing unit 220 is provided on support stands 221 and 221 (one of them is not illustrated) as shown in FIG. 8, and it has, as shown in FIG. 9 and FIG. 10, a pair of peeling means 222 and 222 for removing the jacket 2b from the tip of the jacketed optical fiber 2, driving cylinders 223 and 223 for moving the peeling means 222 toward or away from each other. Right below the peeling means 222 and 222 between the support stands 221 and 221, a waste basket 224 is provided, as illustrated, to receive fiber wastes of the jacket 2b or jacketed optical fiber 2 which are produced from processing the tip of the jacketed optical fiber 2.

Each of the peeling means 222 has, as shown in FIG. 8 through FIG. 10, a slider 222a which engages with a guide rail 221a provided on the support stand 221 in a manner that it is allowed to slide on the rail, and peeling blades 222b which clamp the tip of the jacketed optical fiber 2, and it removes the jacket 2b in cooperation with the movable table 212 which moves toward or away from the jacket removing unit 220.

The driving cylinder 223 is installed on the support stand 221, and it drives the slider 222a. In each cylinder 223, the drawing-out amount of the driving rod 223a is set so that the gap between the peeling blades 222b and 222b is larger than the diameter (=125 μm) of an optical fiber 2a of the jacketed optical fiber 2 but smaller than the thickness (0.4 mm) of the jacket 2b when the driving rod 223a is drawn out and the peeling blades 222b and 222b clamp the jacketed optical fiber 2.

The cleaning unit 230 cleans the optical fibers 2a, which are exposed by removing the jacket 2b from the jacketed optical fiber 2, by wiping off dirt, dust, silicone oil or the like with a wiping cloth $C_B$ to be discussed later. As shown in FIG. 8, the cleaning unit 230 is located between the holding unit 210 and the jacket removing unit 220. The cleaning unit 230 has, as shown in FIG. 8 through FIG. 10, a slide table 231 and a lifting plate 232 which is mounted so that its plate surface is set vertically above the table 231.

The slide table 231 is horizontally installed, as shown, on rails 21a and 21a provided on both sides of the foundation 21 via sliders 231a and 231a, and an opening 231b is provided nearly at the center widthwise. This table 231 is pushed and moved by the push cylinder 233 toward the jacket removing unit 220, i.e., longitudinally toward or away from the support stands 221 and 221, which corresponds to the lateral direction in FIG. 8.

The lifting plate 232 consists of an approximately rectangular plate with its central top portion cut off to form a concave portion 232a as shown in FIG. 9, and it is provided with a slider 232b on its side. The slider 232b is engaged with a guide rail 231c so that it slides vertically, and the guide rail 231c is mounted vertically on a frame 231d provided on one side of the slide table 231. On the opposite side of the slide table 231 from the guide rail 231c is mounted a lifting cylinder 234 for moving the lifting plate 232 up and down as shown in FIG. 9.

The lifting plate 232 is provided with winder drums 235 and 235 with the wiping cloth $C_B$ wrapped around, the drums being located at the top of both sides of the concave portion 232a as shown in FIG. 9; clamping cylinders 236 and 236 on both sides of the concave portion 232a; and a pair of spur gears 237 and 237 which are meshed with each other at the bottom part of the concave portion 232a. At the back, i.e., on the side of the jacket removing unit 220 is installed a motor 238 as shown in FIG. 8.

The wiping cloth $C_B$ wrapped around the winder drums 235 is guided to the meshing point of the spur gears 237 and 237 through the guide rollers 239 which are installed at appropriate points of the lifting plate 232, then discharged through an opening 231b formed in the slide table 231 at the bottom. For the wiping cloth $C_B$, a nonwoven sheet, which is resistant to solvents and which does not leave lint on the optical fibers 2a after wiping it, is used.

When a plurality of optical fibers 2a are wiped and cleaned, the clamping cylinders 236 push from both sides the wiping cloth $C_B$ which is guided through the guide rollers 239 to the meshing point of the spur gears 237 and 237, and clamp a plurality of the optical fibers 2a via the wiping cloth $C_B$.

The spur gears 237 unreel the wiping cloth $C_B$ from winder drums 235 by turning one of the gears 237 by running the motor 238, and discharge used wiping cloth $C_B$ through the opening 231b provided in the slide table 231 at the bottom.

Figure 11:
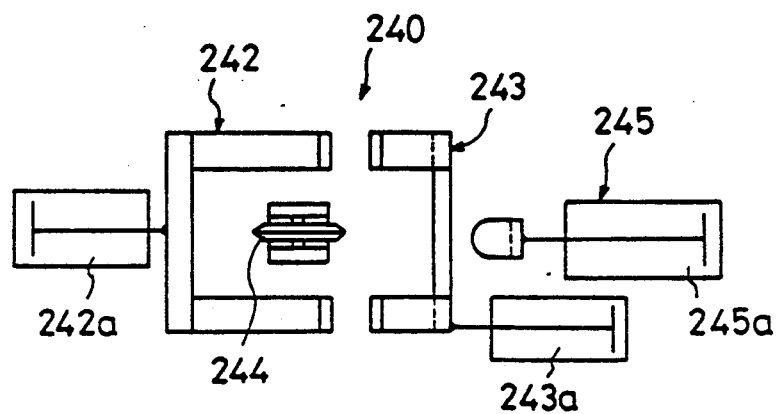
FIG. 11 is a fragmentary view taken in the direction of the arrows substantially along the line A—A of FIG. 9.

As shown in FIG. 8, FIG. 9, and FIG. 11, the cutting unit 240 is installed at the top of the mounting frame 24 provided at a corner of the foundation 21, and it has a support plate 241, clamping assemblies 242 and 243 supported by the support plate 241, a rotary cutter 244, and a push arm 245, the support plate 241 being moved up and down by the lifting cylinder 246 which is installed on the top of the mounting frame 24. The support plate 241 is normally located above the jacket removing unit 220 as shown in FIG. 8 and FIG. 9, and it is moved down only for cutting a plurality of optical fibers 2a.

The clamping assemblies 242 and 243 are designed to clamp a plurality of optical fibers 2a at two points by butting their ends each other through a frictional component such as rubber in a way that they can release the optical fibers 2a, and they are driven by push cylinders 242a and 243a as shown in FIG. 8 and FIG. 9. The rotary cutter 244 is a disk cutter which notches the optical fibers 2a with a blade formed on its periphery, and its revolution is restricted when making a notch in the optical fibers 2a. The rotary cutter 244 is rotated by a specified angle by the driving motor 247 (see FIG. 8) each time it is used for a specific times, so that its blade position is changed. The push arm 245 applies pressure to a plurality of notched optical fibers 2a from a direction intersecting orthogonally with the axis of the jacketed optical fiber 2 to cut them. As shown in FIG. 9 and FIG. 11, the push arm 245 consists of an L-shaped assembly which has a circular arc or flat tip for pressing a plurality of optical fibers 2a, and it is driven by a push cylinder 245a.

In the tip processing unit 20 configured as described above, the fixing means 215 and the clamping means 216 are actuated to fix the holder 12 and to firmly clamp the jacketed optical fiber 2 extending at the rear of the holder 12.

At this time, as the clamping means 216 is actuated and the rod of the clamping cylinder 216a is drawn out, in FIG. 10, the L-shaped arm 217 turns to the left around the support shaft 217a by the tensile force of the tension spring 218. This causes the rear of the holder 12 to be pushed by the L-shaped arm 217, while the front is brought into contact with a stopper 212b of the movable table 212, and thus the holder is located in an appropriate position and fixed by the fixing means 215.

Figure 12:
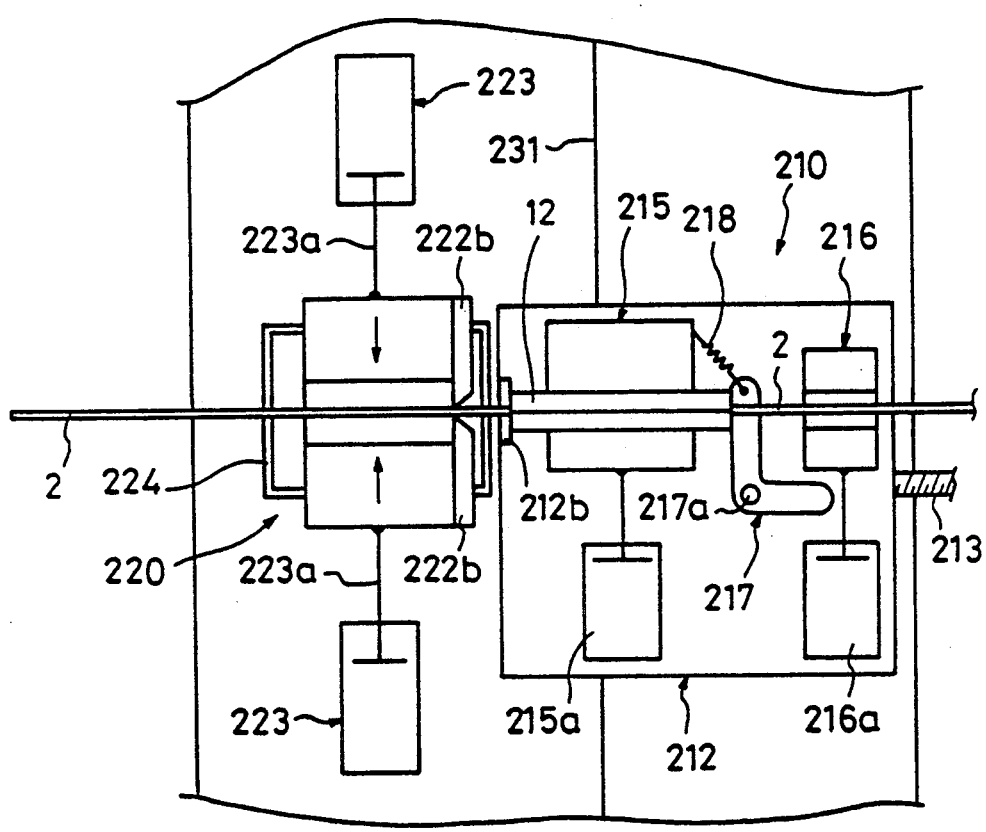
FIG. 12 is an enlarged view of the major section which shows the end of the jacketed optical fiber held in a holding assembly of the tip processing unit shown in FIG. 8, the end being clamped at the portion with the jacket removed.

Next, the driving motor 214 is actuated, and the shaft 213 rotates to move the movable table 212 to a specified position close to the jacket removing unit 220 at the front. Then, in the jacket removing unit 220, as shown in FIG. 12, the driving cylinders 223 and 223 are actuated to draw out the driving rods 223a and 223a, and the peeling blades 222b and 222b clamp the jacketed optical fiber 2 at a specified distance away from its end.

Figure 13:
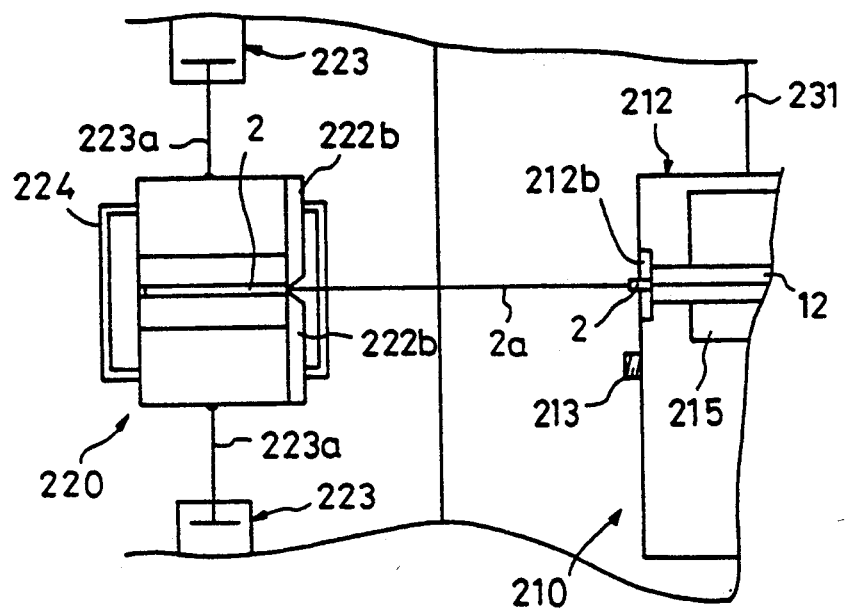
FIG. 13 is an enlarged view of the major section of the tip processing unit, with the jacketed optical fiber semi-stripped by removing its jacket by the jacket removing unit and the holder working together, leaving the jacket on the tip.
Figure 14:
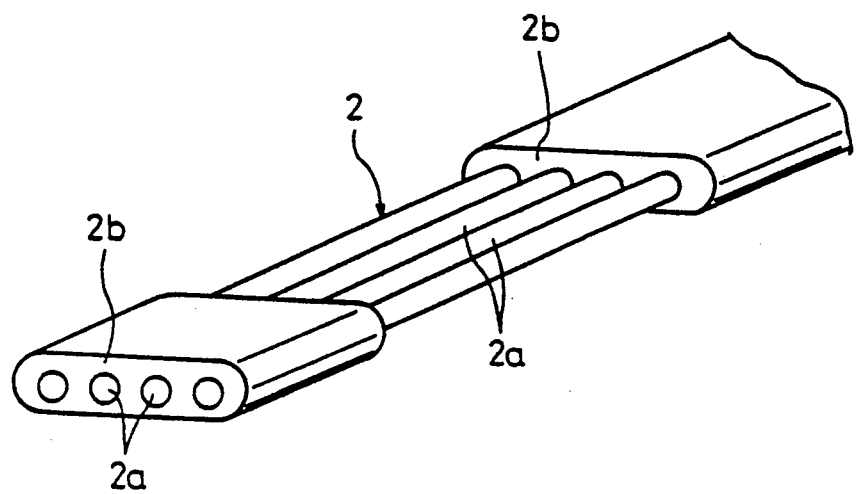
FIG. 14 is a perspective view of the jacketed optical fiber in the semi-stripped state shown in FIG. 13.

Then, the driving motor 214 of the holding unit 210 runs in the reverse direction to move the movable table 212 back by a specified distance to remove the jacket 2b. As shown in FIG. 13, the jacket 2b is removed from the jacketed optical fiber 2 by a length which corresponds to the retreating distance of the movable table 212, leaving a specified length of the jacket 2b on the tip. As a result, a plurality of optical fibers $2a$ of the jacketed optical fiber 2 are exposed by the specified length at the end as shown in FIG. 14. Hereinafter, this condition is referred to as a semi-stripped condition.

Thus, when the jacketed optical fiber 2 is semi-stripped, the exposed optical fibers $2a$ do not become loose while they would if the whole jacket $2b$ were to be removed from the end. This eliminates the need for rearranging a plurality of optical fibers $2a$ in parallel, permitting smooth implementation of the subsequent cleaning and cutting processes.

Figure 15:
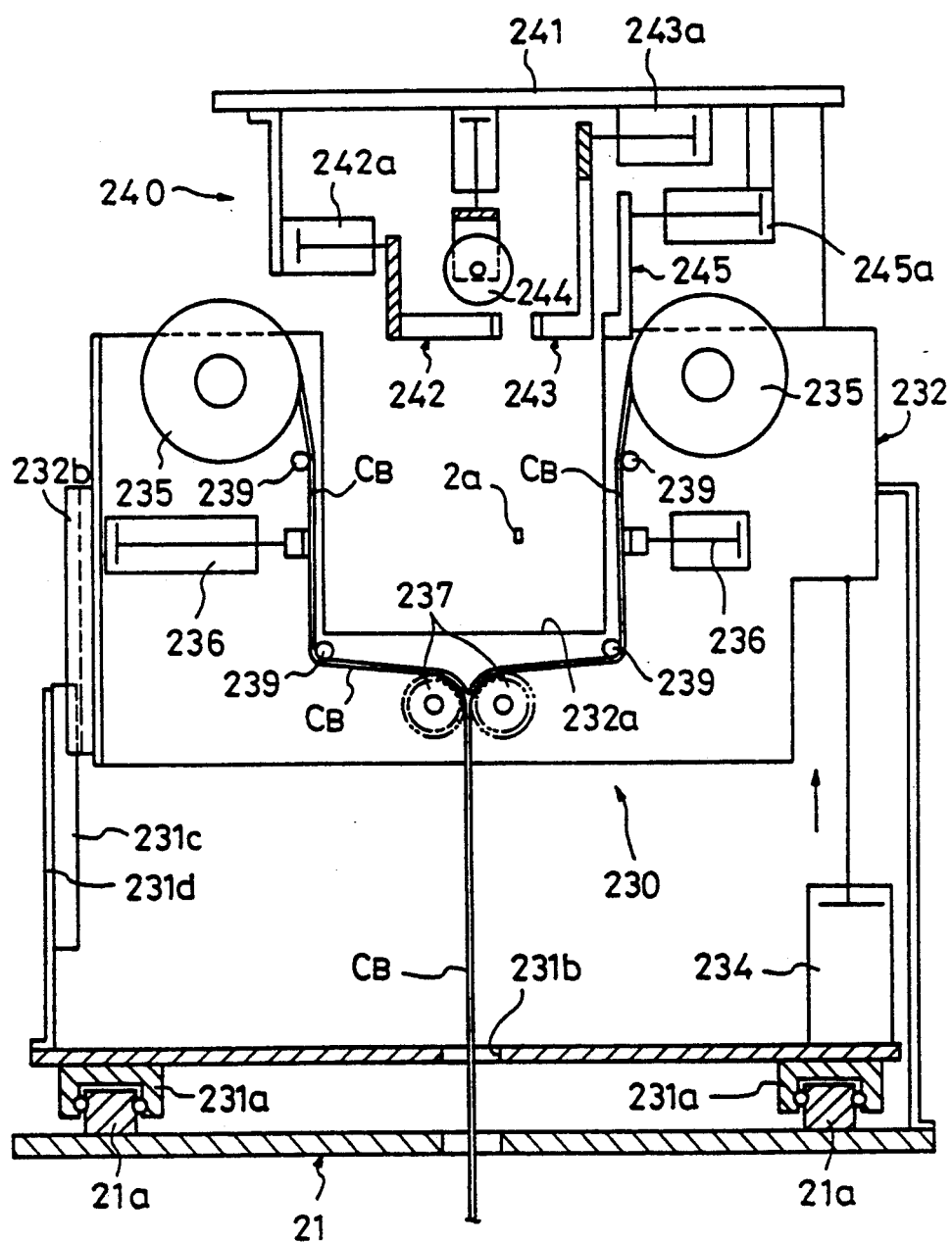
FIG. 15 is a front view combined with a partial cross-sectional view of the tip processing unit with the cleaning unit up and in operation.
Figure 16:
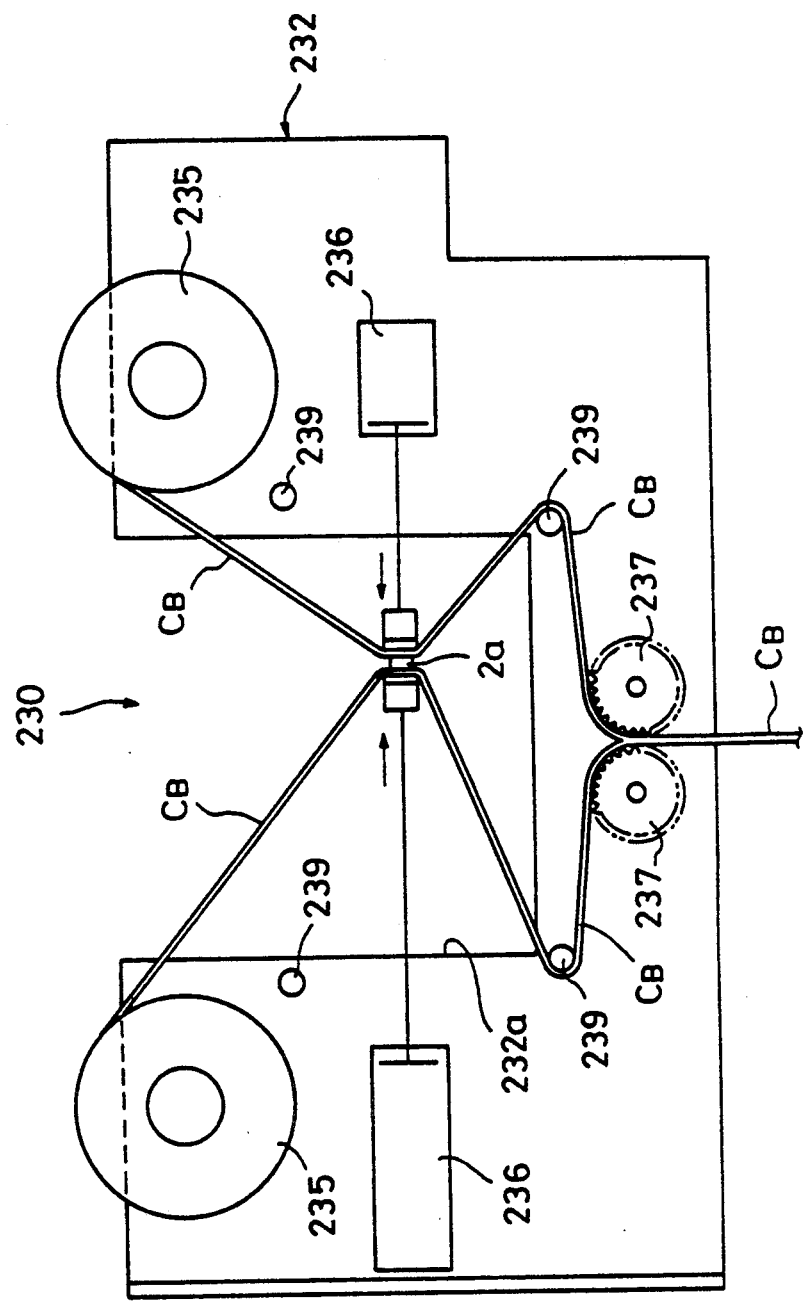
FIG. 16 is an enlarged front view of a plurality of optical fibers clamped by a clamping cylinder in the cleaning unit.

After the jacketed optical fiber 2 is thus semi-stripped, the cleaning unit 230 starts its operation, and the lifting cylinder 234 raises the lifting plate 232 as shown in FIG. 15, then a spraying unit not illustrated applies alcohol to each wiping cloth $C_B$ located near the clamping cylinders 236. Subsequently, the cylinder rods of the clamping cylinders 236 are drawn out, and the optical fibers $2a$ of the optical fiber 2 are clamped via the wiping cloth $C_B$ as shown in FIG. 16.

Figure 17:
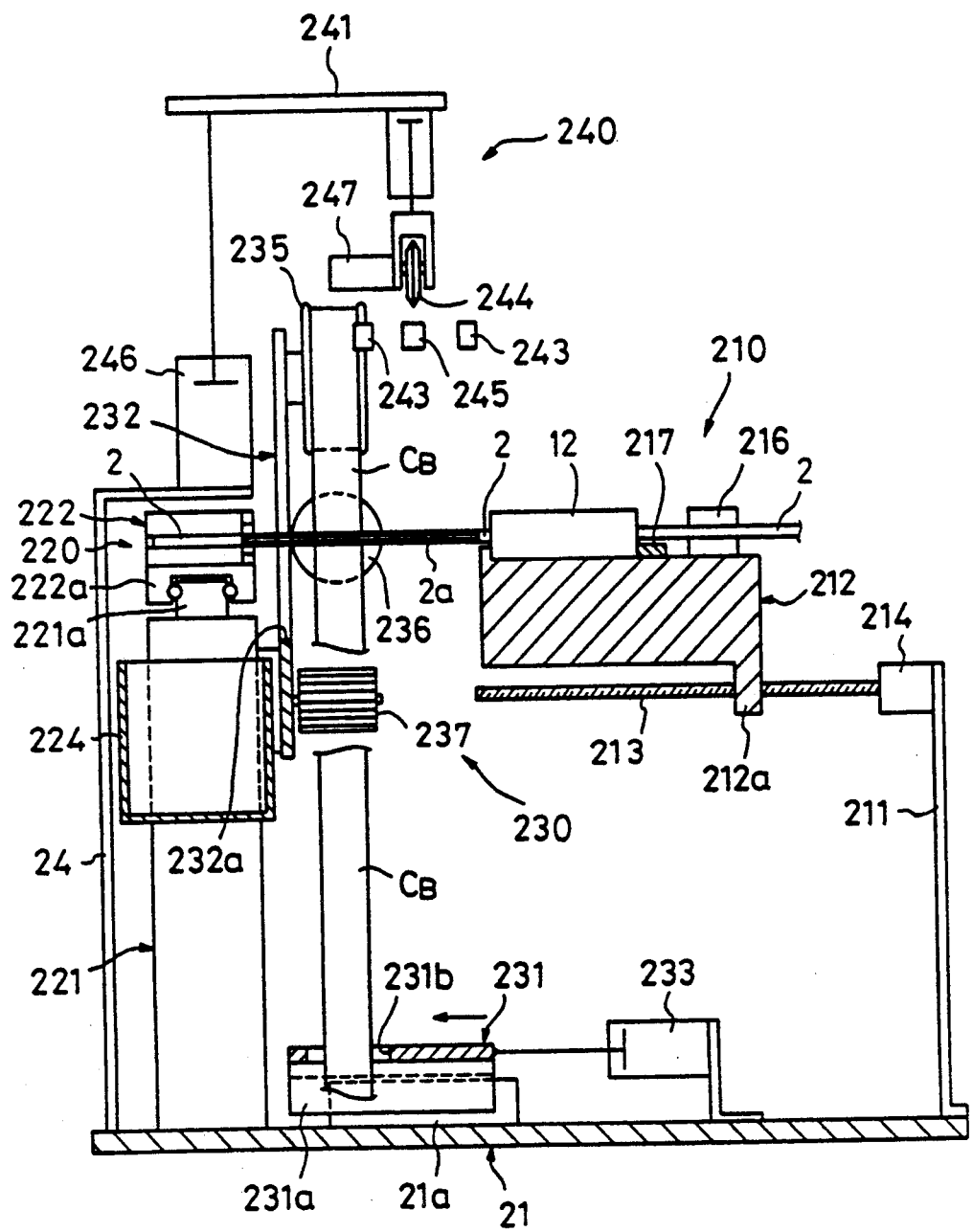
FIG. 17 is a side view, partially in cross-section, of the tip processing unit when a plurality of the optical fibers are cleaned by wiping them with a wiping cloth under the condition illustrated in FIG. 16.

After that, the push cylinder 233 is actuated, the slide table 231 advances toward the jacket removing unit 220 as shown by the arrow in FIG. 17, and the optical fibers $2a$ are wiped with the wiping cloth $C_B$ moistened with alcohol to remove dirt, dust, silicone oil or the like from the surfaces.

Figure 18:
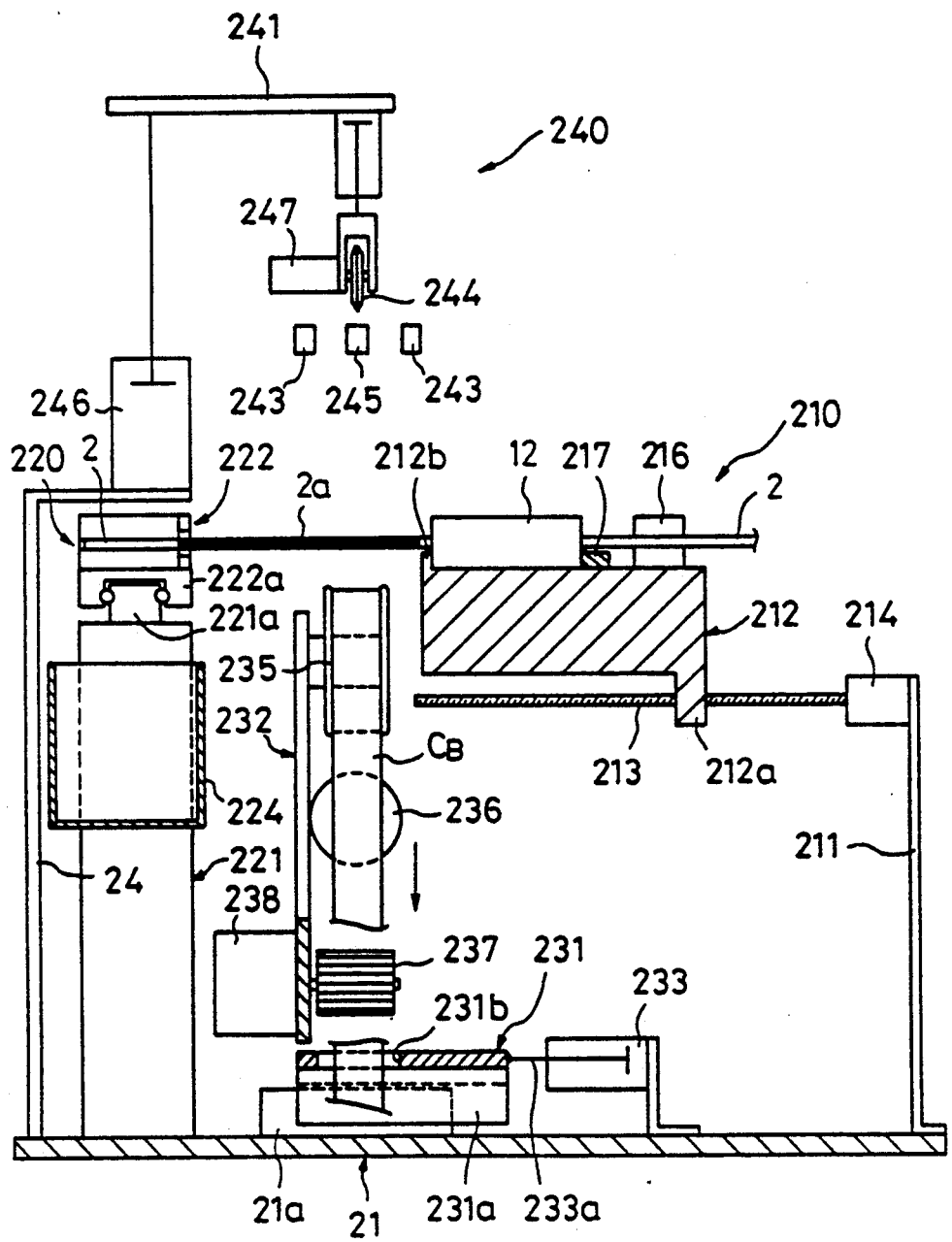
FIG. 18 is a side view, partially in cross-section, of the cleaning unit which is down after it finishes cleaning a plurality of the optical fibers by wiping.

Upon completion of the wiping of the optical fibers $2a$, the cylinder rods of the clamping cylinders 236 draw back, the optical fibers $2a$ are unclamped, and the cleaning unit 230 is reset to the condition before wiping as shown in FIG. 18.

Subsequently, the push cylinder 233 moves in the reverse detection to move back the slide table 231, and the spur gears 237 and 237 are rotated by the motor 238 to unwind the wiping cloth $C_B$ by a specified length from the winder drums 235. This causes the portions of the wiping cloth $C_B$ that has been soiled from wiping to move down, thus ensuring that the optical fibers $2a$ are always wiped with clean wiping cloth $C_B$. Further, the wiping cloth $C_B$ that has been soiled from such wiping is successively discharged through the opening $231b$ in the slide table 231.

Figure 19:
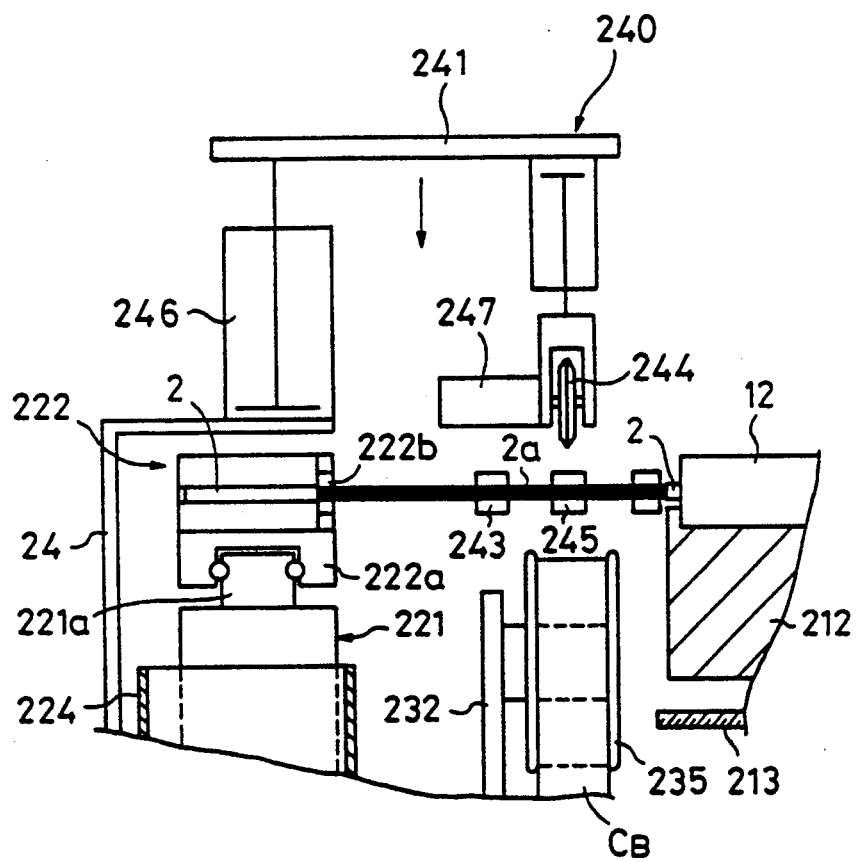
FIG. 19 is an enlarged side view of the major section of the tip processing unit with the cutting unit down and in operation.

When the wiping process is repeated a few times and the cleaning of the optical fibers $2a$ is finished, the lifting cylinder 234 moves in the reverse direction to move down the lifting plate 232 as shown in FIG. 19, thereby finishing all steps involved in the cleaning operation implemented by the cleaning unit 230.

Figure 20:
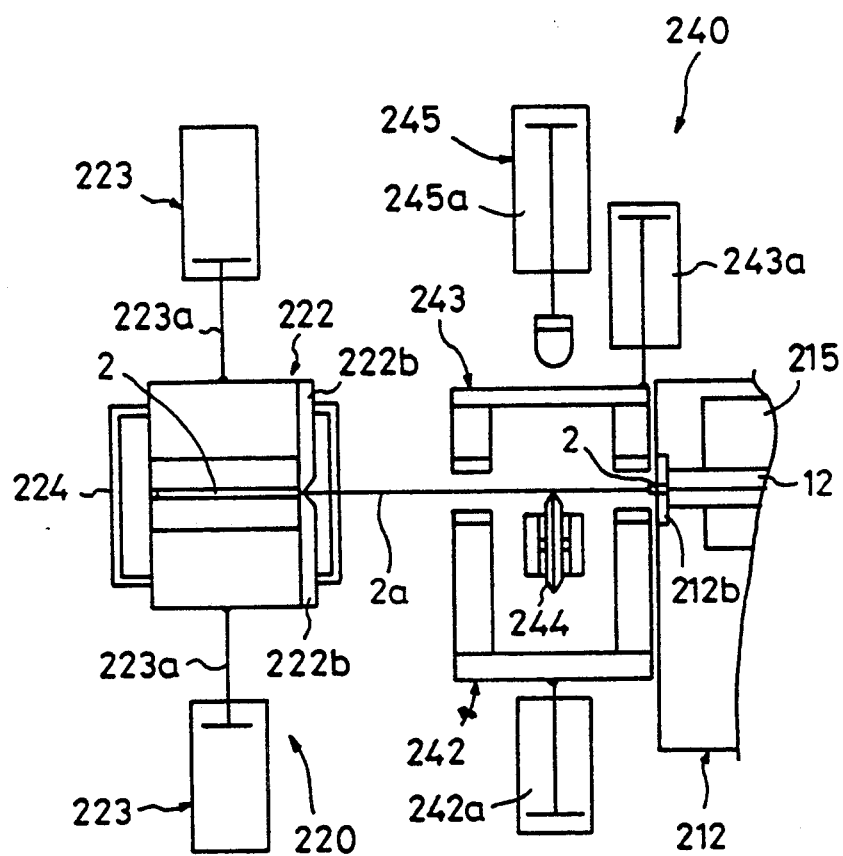
FIG. 20 is a plan view of FIG. 19.

In the next stop, the cutting unit 240 starts its operation, and the lifting cylinder 246 lowers the support plate 41 from the position shown in FIG. 18 to the position shown in FIG. 19. The positional relationship between the jacketed optical fiber 2 and the components of the cutting unit 240 observed from above is shown in FIG. 20.

Figure 21:
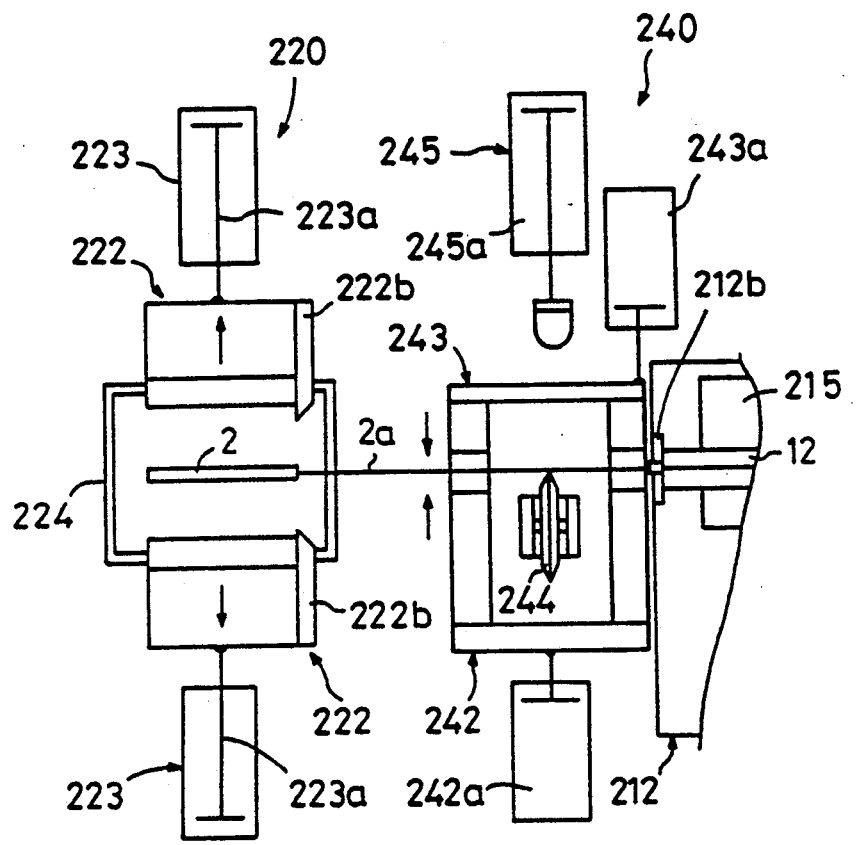
FIG. 21 is a plan view enlarging a state where the optical fibers are released from a peeling means, and the optical fibers are held in a clamping assembly.
Figure 22:
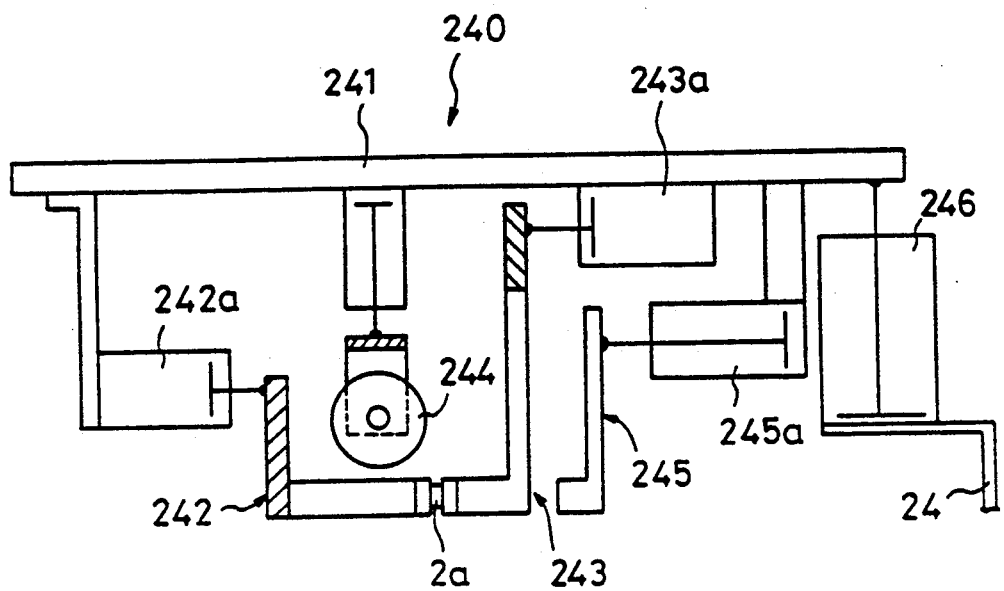
FIG. 22 is a front, enlarged view of FIG. 21 observed from the front.

Then, as shown in FIG. 21, the clamping assemblies 242 and 243 are actuated to clamp the optical fibers $2a$ at two points, and the driving cylinders 223 of the jacket removing 220 move in the reverse direction to draw in the driving rod $223a$, releasing the jacketed optical fiber 2 from the peeling blades $222b$ and $222b$. The front view of the cutting unit 240 under such condition is shown in FIG. 22.

Figure 23:
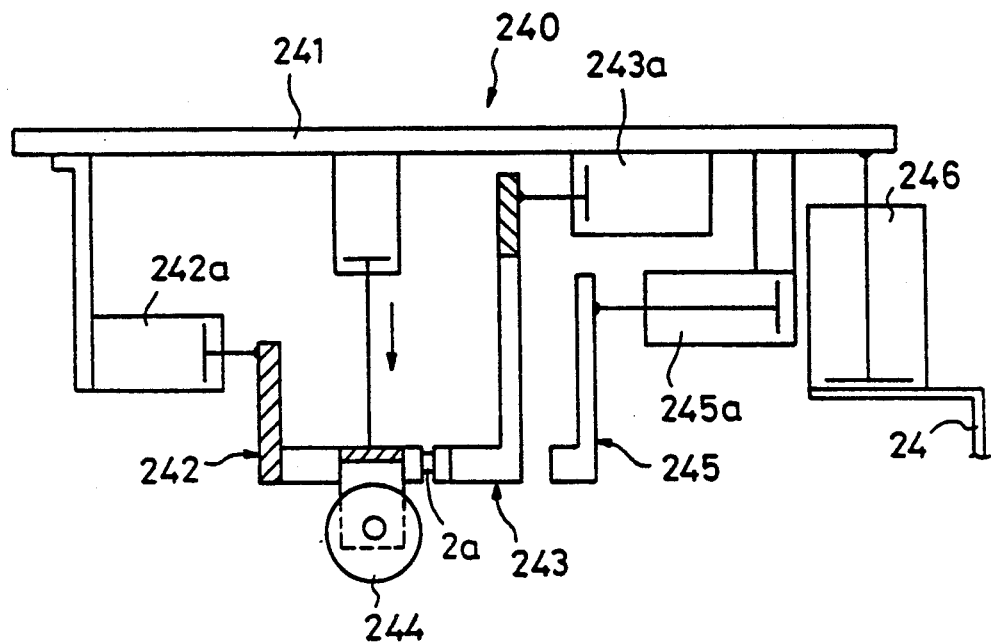
FIG. 23 is a front, enlarged view of a state where a rotary cutting unit is down to cut notches in a plurality of optical fibers under the condition of FIG. 22.

After that, as shown in FIG. 23, the rotary cutting unit 244 descends to make a preliminary cut in each of the optical fibers $2a$ at a specified point which intersects orthogonally with the axis of the jacketed optical fiber 2.

Figure 24:
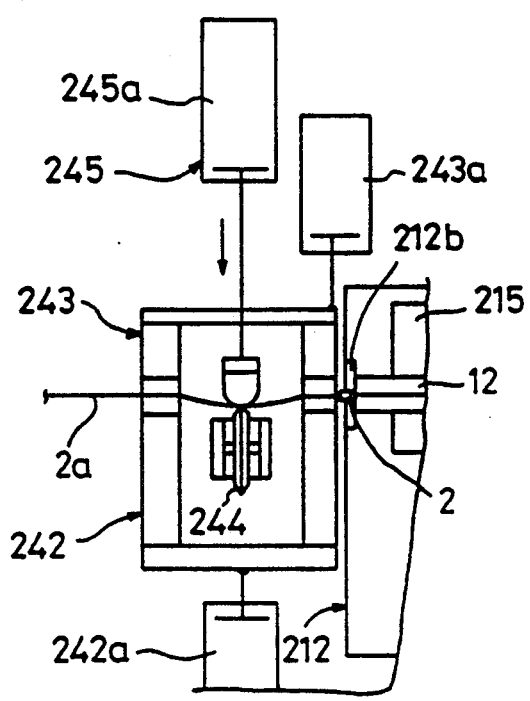
FIG. 24 is a plan, enlarged view of the major section of the cutting unit in its cutting operation where it trims a plurality of the notched optical fibers to a specified length.

Subsequently, as shown in FIG. 24, the push cylinder $245a$ operates, and the optical fibers $2a$, which are clamped by the clamping assemblies 242 and 243 at the two points, are pressed by the push arm 245 at the notched points and trimmed to a specified length.

Figure 25:
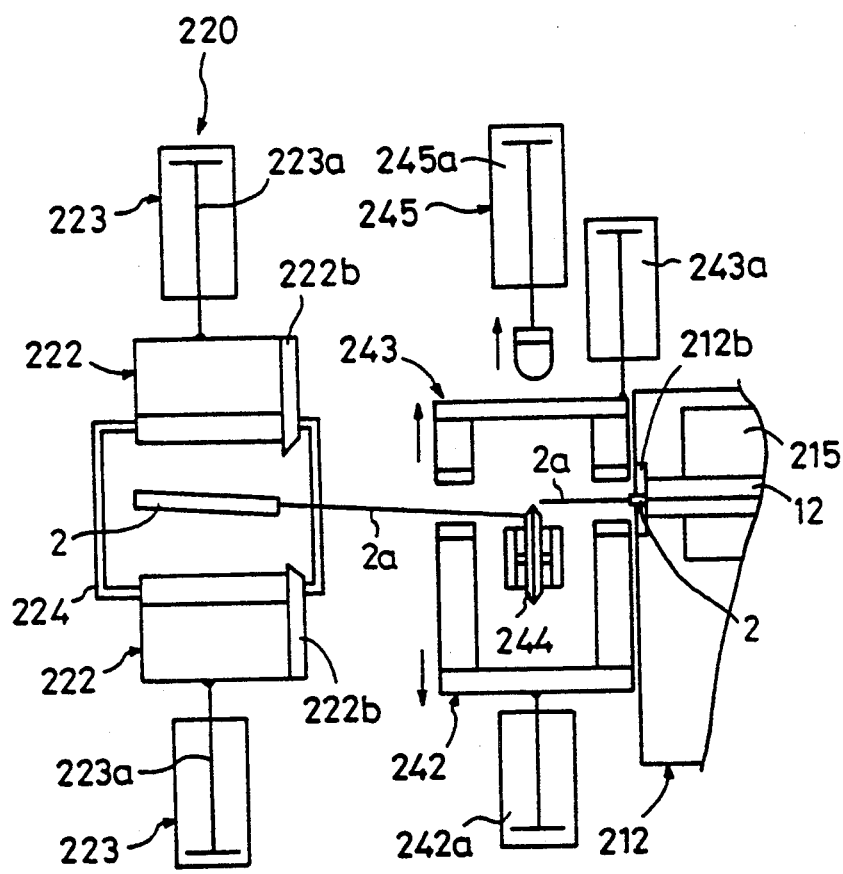
FIG. 25 is a plan view which illustrates a state where a plurality of the optical fibers have been trimmed, and the clamping assembly has released the optical fibers.

In the next step, as shown in FIG. 25, the push cylinders $242a$ and $243a$ move in the reverse direction to release the clamping assemblies 242 and 243 holding the two points of the optical fibers $2a$, and at the same time, the push cylinder $245a$ moves in the reverse direction to move the push arm 245 back. At this time, optical fiber wastes from the end of the jacketed optical fiber 2 resulting from the trimming are dropped into the waste basket 224 located below.

After that, the rotary cutting unit 244 returns to its home position, and the lifting cylinder 246 raises the support plate 241, completing the cutting process carried out by the cutting unit 240.

Figure 26:
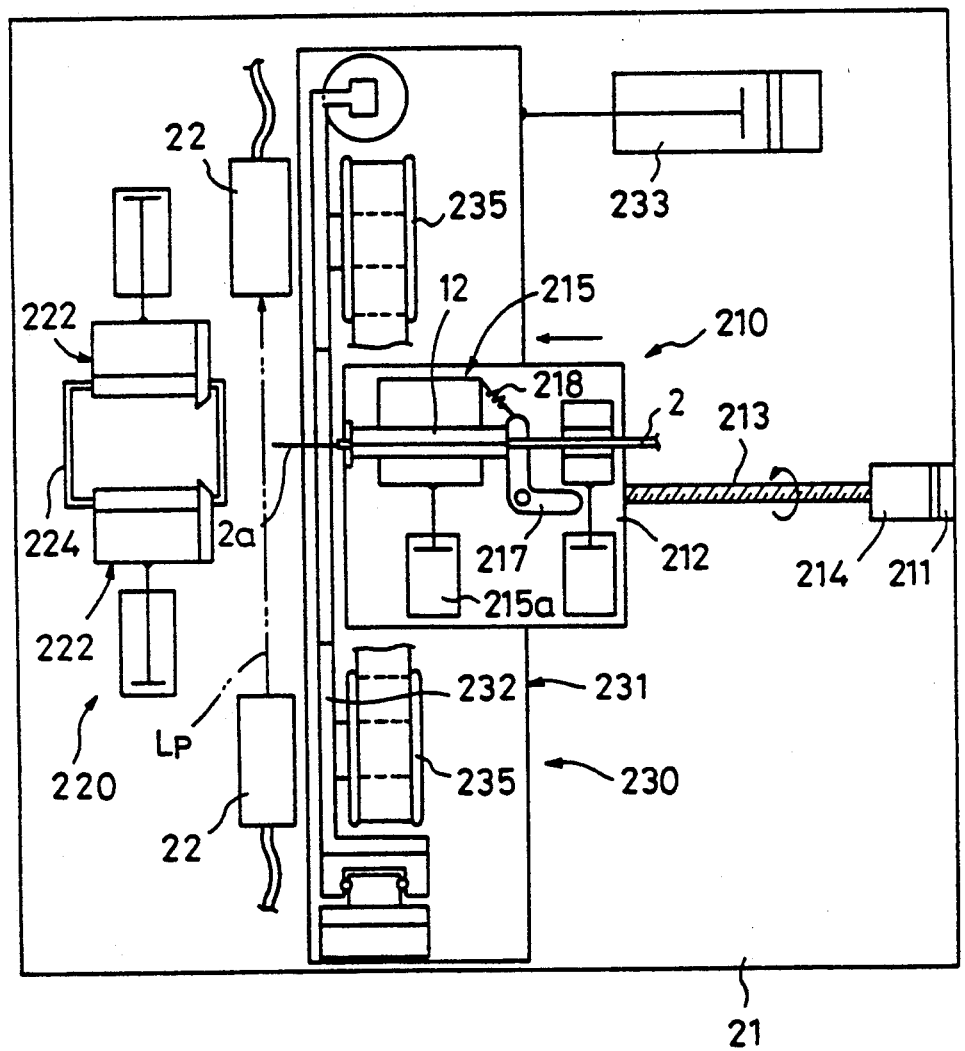
FIG. 26 is a plan view of the tip processing unit in a process of inspection of the cut condition of the optical fibers whose tips have been trimmed to the specified length.
Figure 27:
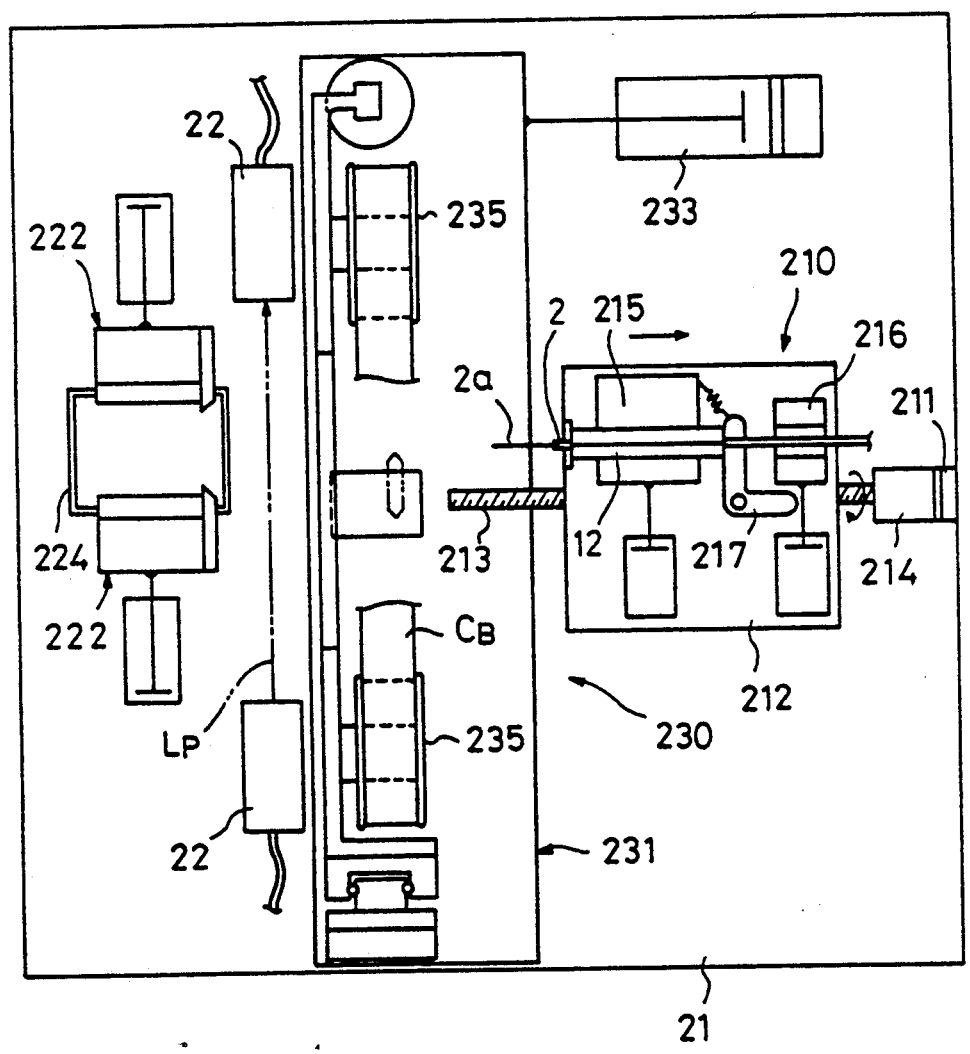
FIG. 27 is a plan view of the tip processing unit which shows a state where the cutting operation of the optical fibers has been completed with a movable table of the holding unit reset to its home position.

Upon completion of the cutting process wherein the optical fibers $2a$ are trimmed to the specified length, the laser sensors 22 and 22 inspect whether the tips of the optical fibers $2a$ have been properly processed. More specifically, as shown in FIG. 26, the driving motor 214 is actuated to advance the movable table 212 by a specified distance, and the ends of the optical fibers $2a$, which have been trimmed, are passed through a light path $L_P$ of a laser beam shown by a 2-dot chain line in the drawing, then it is determined whether the trimmed conditions are good or not according to the amount of light received by the receiving laser sensor 22. As soon as the inspection is completed, the driving motor 214 is actuated, and the movable table 212 is returned to its home position as shown in FIG. 27.

When the processed tips are found to be good as a result of such inspection, the hand chucks $43d$ and $43d$ of the carrying unit 40 grip the holder 12 holding the jacketed optical fiber 2 and carry it to the next process. On the other hand, if the processed tips are found to be bad, then the carrying unit 40 carries the holder 12 holding the jacketed optical fiber 2 to the pull-out unit 50 to be discussed later.

CONNECTING UNIT 30

Figure 6:
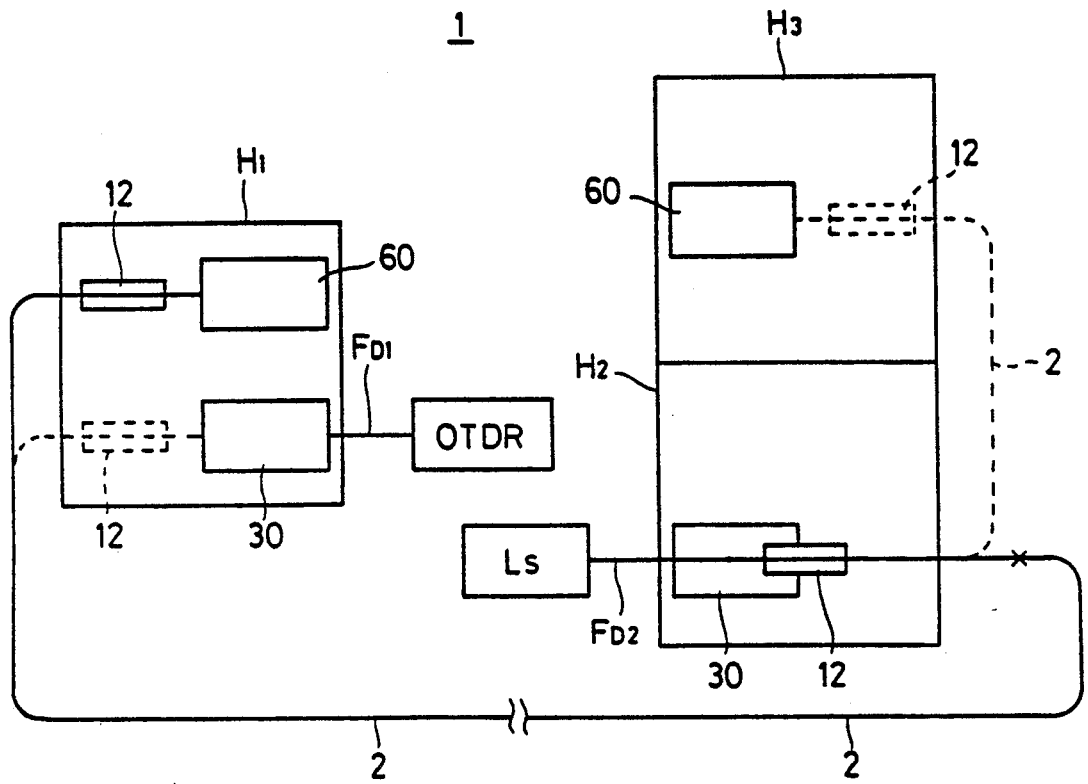
FIG. 6 is a schematic diagram of a device illustrating the optical measurement of optical fibers by the automatic optical measuring apparatus for optical fibers according to the present invention.

The connecting unit 30 is provided in the first housing $H_1$ and the second housing $H_2$. The connecting unit 30 provided in the first housing $H_1$ is used for measurement using the backscattering method, while the connecting unit 30 provided in the second housing $H_2$ is used for measurement using the cutback method. The connecting unit 30 of the first housing $H_1$ temporarily butt-connects one end of the jacketed optical fiber 2 to the OTDR via a dummy fiber $F_{D1}$ as shown in FIG. 6, while the connecting unit 30 installed in the second housing $H_2$ temporarily butt-connects the other end of the jacketed optical fiber 2 to a light source $L_S$ of the measuring light via a dummy fiber $F_{D2}$. As the light source $L_S$ of the measuring light, and LED, semiconductor laser or halogen, for example, can be used.

Figure 28:
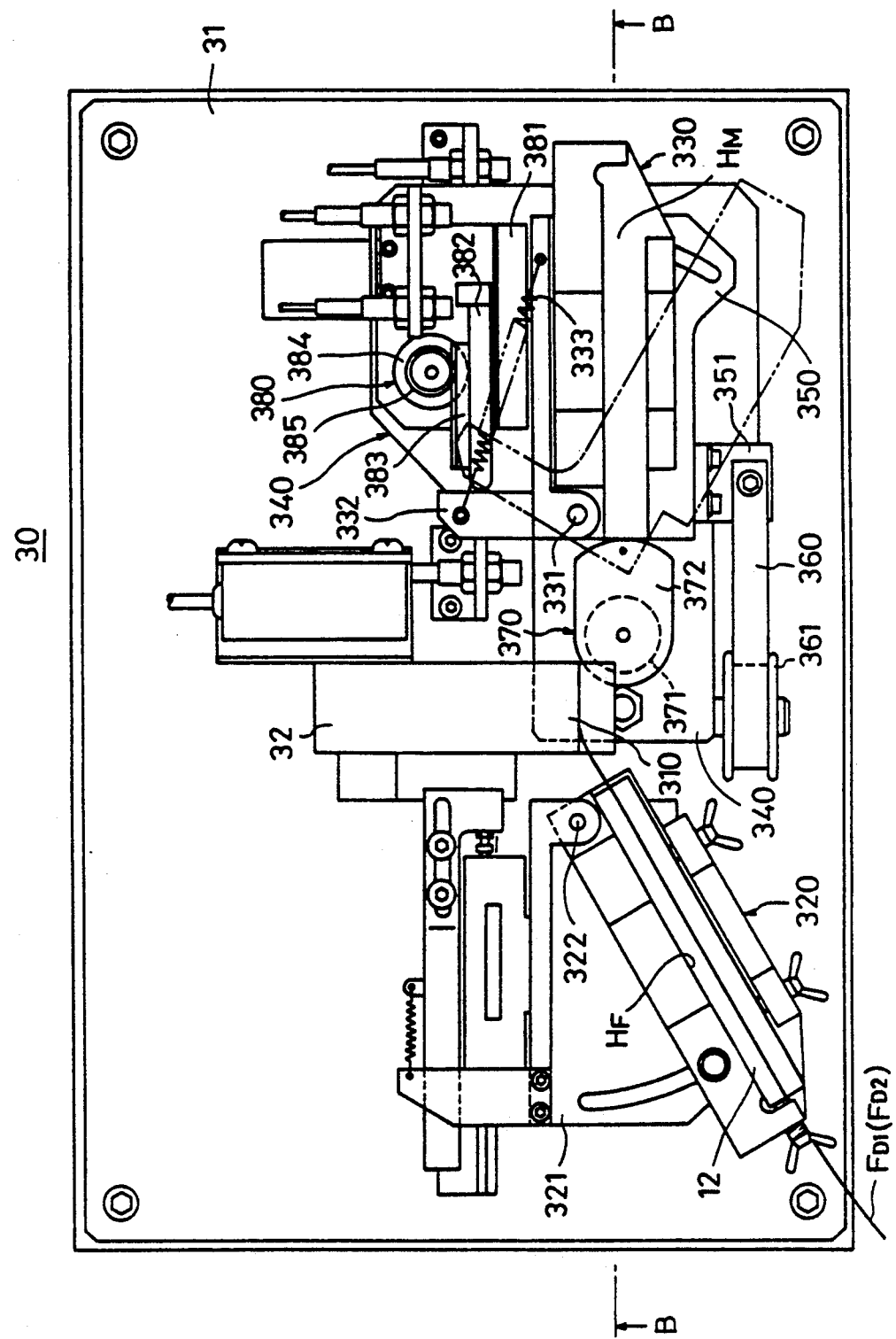
FIG. 28 is a plan view of a connecting unit.
Figure 29:
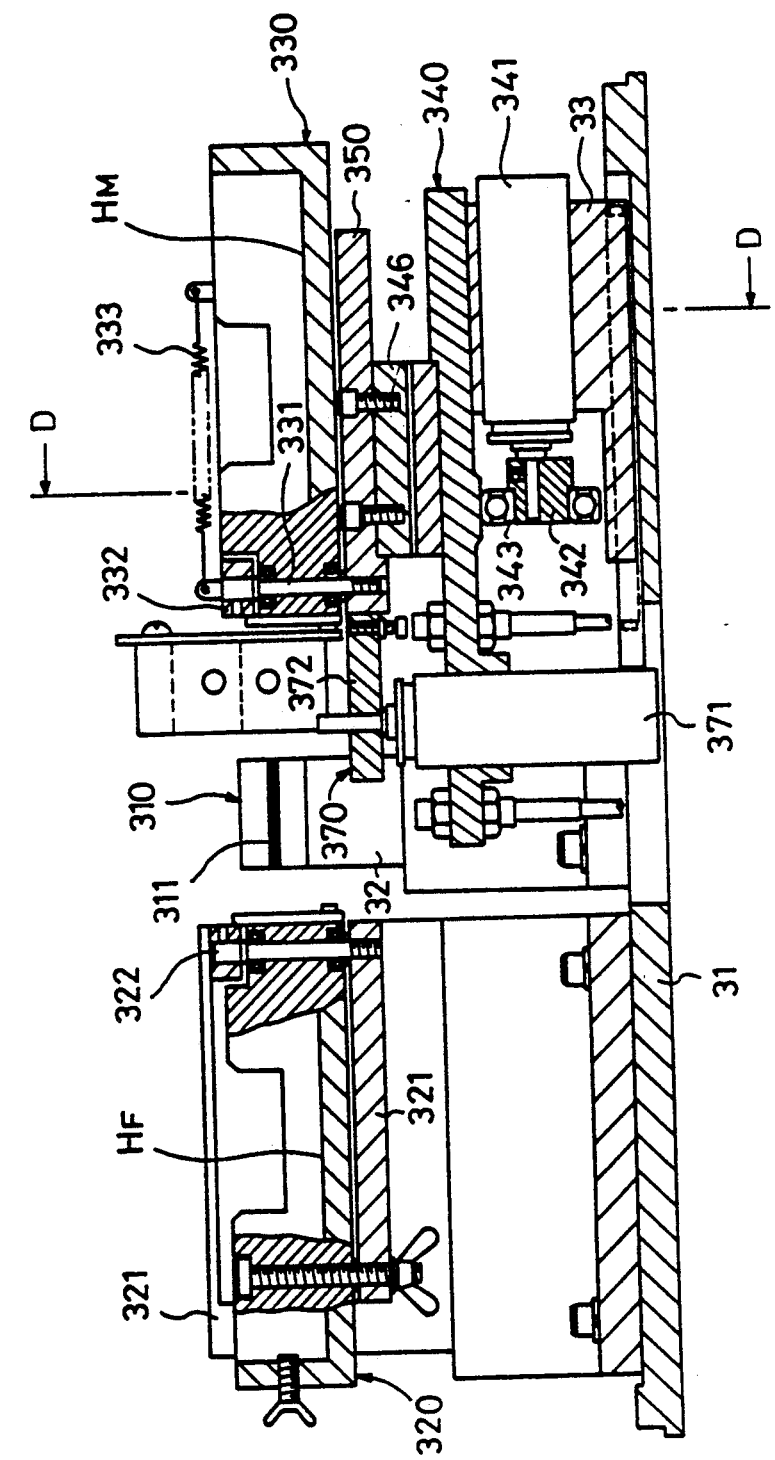
FIG. 29 is a cross-sectional view taken along the line B—B of FIG. 28.
Figure 30:
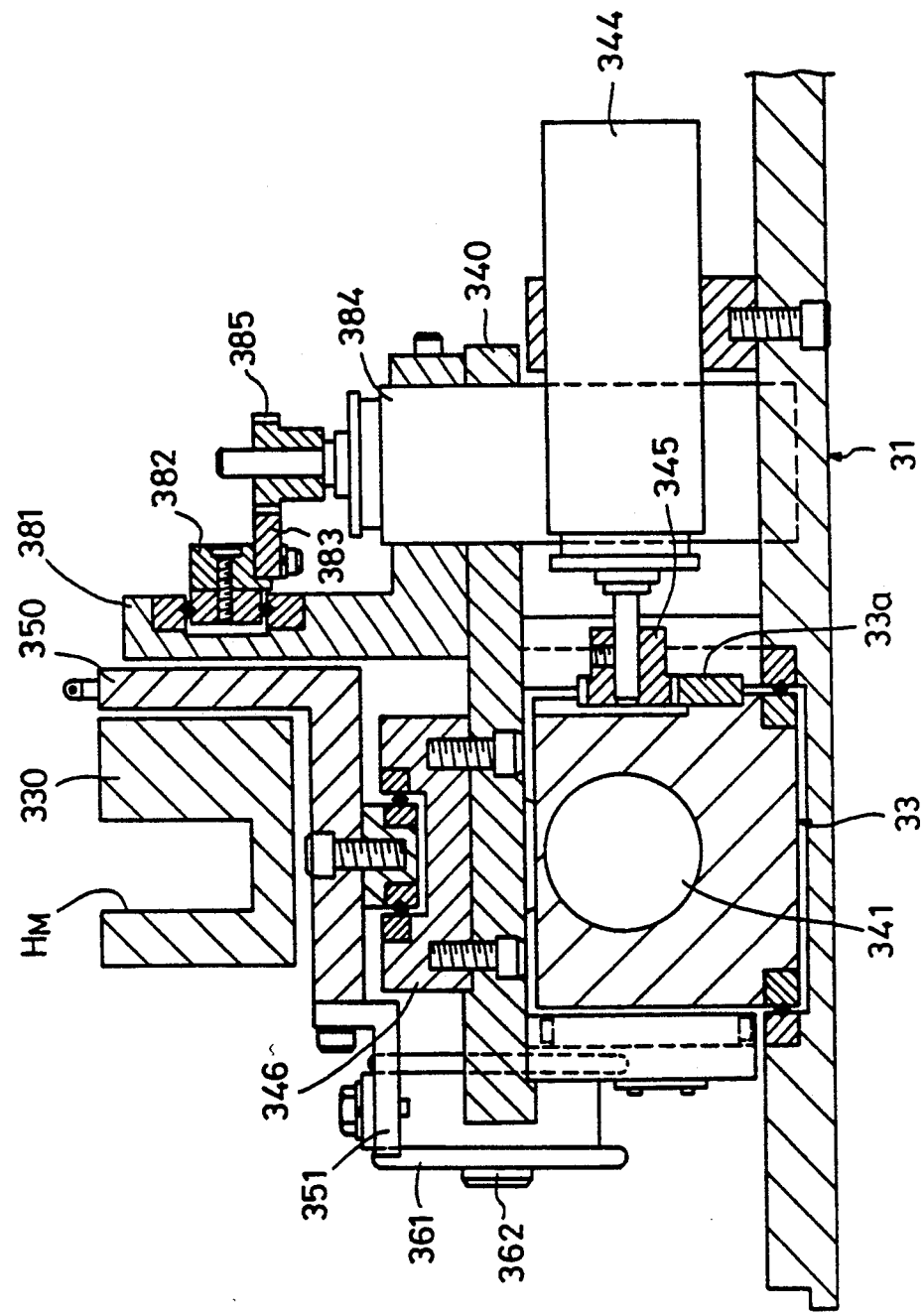
FIG. 30 is a cross-sectional view taken along the line D—D of FIG. 29.

As shown in FIG. 28 through FIG. 30, the connecting unit 30 is equipped with a butting assembly 310, mounting bases 320 and 330 which are located lengthwise on both sides of the butting assembly 310, a support table 340, a butting stage 350, a power spring 360, a movement restricting means 370, and a turn restricting means 380 which are all mounted on a pedestal 31.

The butting assembly 310 is a rectangular assembly with a plurality of V grooves 311 formed at its front, and it guides the optical fibers of the jacketed optical fiber 2 with its tip processed and the dummy fiber $F_{D1}$ or the dummy fiber $F_{D2}$ into the V grooves 311 to butt-connect those ends. The butting assembly 310 is mounted on the top of the support assembly 32 which is installed on the pedestal 31.

The mounting bases 320 and 330 are mutually symmetrical, and on which are mounted the holder 12 holding the jacketed optical fiber 2 and the holder 12 holding the dummy fiber $F_{D1}$ or the dummy fiber $F_{D2}$. As shown in FIG. 28, they are supported by a fixing stage 321 and a butting stage 350, respectively, with rotary pins 322 and 331 in a manner that they can turn on the side of the butting assembly 310.

The mounting base 320 is turned by a specified angle with respect to the butting assembly 310 in advance before it is fixed on the fixing stage 321; and the holder 12 holding the dummy fiber $F_{D1}$ or the dummy fiber $F_{D2}$ is attached to the mounting assembly $H_F$. The ends of both dummy fibers $F_{D1}$ and $F_{D2}$ are processed beforehand; the dummy fibers $F_{D1}$, $F_{D2}$ are connected to the OTDR or the light source $L_S$ at one side, and they are flexibly fitted in the V grooves 311 of the butting assembly 310 at the other side.

The mounting base 330 has an arm 332 provided widthwise at the front on its one side, and it is energized in the direction of turn, which is indicated by a 2-dot chain line in FIG. 28, around the rotary pin 331 by a coil spring 333. To a mounting assembly $H_M$ is attached the holder 12 holding the end of the jacketed optical fiber 2.

As shown in FIG. 29, the support table 340 is mounted on a movable base 33 which is allowed to move lengthwise (laterally in the drawing) on the pedestal 31. The support table 340 is moved up and down by a driving motor 341 installed on the movable base 33, an eccentric cam 342 attached to the rotary shaft of the motor 341, and a bearing 343 which is externally fitted onto the cam 342. The movable base 33 is moved lengthwise together with the support table 340, as shown in FIG. 30, by engaging a pinion 345 attached to the rotary shaft of a driving motor 344 with a rack 33a on the side.

As shown in FIG. 28 and FIG. 29, the butting stage 350 is located above the support table 340 with a slide mechanism 346 between them so that it is allowed to move lengthwise, and it is energized in its advancing direction, toward the butting assembly 310, by a spiral spring 360 mounted on the outer side surface. The spring 360 has its tip linked to a coupling flange 351 provided on the side of the front edge of the butting stage 350, its bottom side being wrapped around a spool 361. The spool 361 is supported by a support shaft 362 mounted on a side surface of the support table 340 in a manner that it is allowed to rotate. The spiral spring 360 has a force of about 7 gw to 25 gw for energizing the butting stage 350 in the case of a jacketed optical fiber having, for example, a single to five optical fibers, although the force value varies according to the number of optical fibers of the jacketed optical fiber 2.

The movement restricting means 370 is designed to inhibit and disinhibit the movement of the butting stage 350 toward the butting assembly 310, and it has a driving motor 371 installed on the support table 340, and a cam plate 372 attached to the rotary shaft of the motor 371 as shown in FIG. 28 and FIG. 29. The cam surface of the cam plate 372 is in contact with the front edge of the butting stage 350 to inhibit the movement of the stage 350, which is energized by the spiral spring 360, toward the butting assembly 310.

The turn restricting means 380 is mounted on the support table 340, and it is designed to inhibit and disinhibit the turn of the mounting base 330 around the rotary pin 331, the turn being caused by the energizing force applied by the coil spring 333. As shown in FIG. 28 and FIG. 30, the turn restricting means 380 is equipped with a push assembly 382 which is installed on a support frame 381 so that it is allowed to move lengthwise, spur gear 383 installed at the bottom of the assembly 382, and a driving motor 384 for moving the push assembly 382. A gear 385 meshing with the spur gear 383 is fitted on the rotary shaft of the driving motor 384. The push assembly 382 moves lengthwise while keeping its front end in contact with the arm 332 provided on the mounting base 330, thereby inhibiting and disinhibiting the turn of the mounting base 330 which is energized in the rotating direction by the coil spring 333.

In the connecting unit 30 which is configured as described above, the holder 12 carried by the carrying unit 40 is mounted on the mounting assembly $H_M$ of the mounting base 330 by the hand chucks 43d and 43d.

Then, the driving motor 341 is first actuated to raise the support table 340 to a specified height. The raising level is the height at which a plurality of optical fibers 2a extending from the holder 12 mounted on the mounting assembly $H_M$ meet a plurality of V grooves 311 of the butting assembly 310, the height being determined by monitoring a plurality of optical fibers 2a by means of a position sensor which is not illustrated.

Next, the driving motor 344 is actuated to move the movable base 33 toward the butting assembly 310 by a specified distance until the optical fibers 2a reach a position for meeting the V grooves 311.

Subsequently, the turn restricting means 380 is actuated, the driving motor 384 moves the push assembly 382 back, and the mounting base 330 turns to a position shown by the 2-dot chain line in FIG. 28 by the energizing force of the coil spring 333. Thus, the individual optical fibers 2a exposed at the end of the jacketed optical fiber 2 extending from the holder 12 are pressed with their ends in contact with the individual V grooves 311 of the butting assembly 310, and they are appropriately bent in the individual V grooves 311.

After that, the movement restricting means 370 is actuated, and the driving motor 371 turns the cam plate 372, causing the butting stage 350 to advance from the energizing force of the spiral spring 360. This temporarily butt-connects the individual optical fibers 2a, which are bent appropriately in the individual V grooves 311, to the individual optical fibers of the dummy fibers $F_{D1}$ or $F_{D2}$ which are connected to the light source $L_S$ or the OTDR, and optical measurement of the individual optical fibers 2a is performed. At this time, since the individual optical fibers of the jacketed optical fiber 2 and the dummy fibers $F_{D1}$ and $F_{D2}$ are bent in the individual V grooves 311, the butted optical fibers can be properly interconnected even if there is a slight difference in the length of the individual optical fibers, thus eliminating the possibility of inconvenience occurring during the optical measurement.

When the optical measurement of the jacketed optical fiber 2 is completed, the mounting base 330 is returned to its home position in the reverse order of the above-mentioned operation sequence.

After that, the holder 12 mounted on the mounting assembly $H_M$ of the mounting base 330 is carried back to its home position on the holder pallet 11 by the carrying unit 40.

The carrying unit 40 carries the next holder 12 which is then mounted on the mounting assembly $H_M$, and the foregoing optical measurement is repeated.

During the process, the position to which the movable base 33 moves lengthwise, the height of the support table 340, the turning position of the cam plate 370 restricting the lengthwise position of the butting stage 350, and the position of the push assembly 382 which inhibits and disinhibits the turn of the mounting base 330 are detected by position sensors such as proximity sensors individually installed. Based on the detection results, the controlling unit 90 installed in the third housing $H_3$ controls their movement or rotation in order to locate them in correct positions.

CARRYING UNIT 40

The carrying units 40 are installed at the top parts of the housings $L_1$ through $L_3$, and each of them has, as shown in FIG. 2 and FIG. 4, a slide plate 41, a moving means 42 installed below the slide plate 41, and a clamping means 43 which is suspended from the moving means 42.

In the first housing $L_1$ and the second housing $L_2$, two pairs of the moving means 42 and the clamping means 43 are installed lengthwise with a specified distance between them under the slide plate 41. This is for performing the tip processing and the butt-connection of the jacketed optical fiber 2 at the same time in the housings $L_1$ and $L_2$ by carrying the holder 12 held by one clamping means 43 to the tip processing unit 20 and carrying another holder 12 held by the other clamping means 43 to the connecting unit 30, while staggering it by one step.

The slide table 41 is mounted on guide rails 41a and 41a which are mounted on the bottom of a top plate 5 of each of the housings $L_1$ through $L_3$ so that each of the slide table 41 is allowed to slide along the length of the housings $L_1$ through $L_3$ by a driving belt 44. The driving belt 44 is installed on a driving motor and pulley which are not illustrated, the middle thereof being fixed on one side of the table 41.

The moving means 42 has support assemblies 42a and 42b, a rodless cylinder 42c and two guide bars (not illustrated) provided between the two assemblies 42a and 42b, and a slide block 42d supported by those cylinder 42c and the guide bars in a way that it is allowed to move.

The clamping means 43 has a cylinder body 43a located on the bottom of the slide block 42d, rods 43b and 43b, a support plate 43c, and two pairs of hand chucks 43d and 43d mounted on the support plate 43c. The clamping means 43 of the third housing $L_3$ has a wedge 45 between the hand chucks 43d and 43d on the bottom of the support plate 43c. The wedge 45 coercively opens the holder 12 which is located on the holder pallet 11, and is closed by magnetic force. This makes it possible for the opened holder 12 to hold the cut end of the jacketed optical fiber 2 on the $L_2$ side when performing the measurement using the cutback method.

Accordingly, in each carrying unit 40, the clamping means 43 first draws out the rods 43b and 43b, and the hand chucks 43d and 43d hold the first holder 12 arranged on the holder pallet 11 located below.

The clamping means 43 then lifts the holder 12 held by drawing in the rods 43b and 43b. In parallel to this operation, the moving means 42 and the driving belt 44 move the slide table 41 lengthwise by the driving belt 44 to move lengthwise the holder 12 held by the clamping means 43, and the moving means 42 moves the slide block 42d widthwise.

Thus, the hand chucks 43d and 43d of the clamping means 43 hold the individual holders 12 arranged on the holder pallet 11, and carry them in three-dimensional directions, i.e., lengthwise, widthwise and vertical directions, in the individual housings $L_1$ through $L_3$ in accordance with a carrying sequence stored in the controlling unit 90 beforehand, thereby carrying them to the tip processing unit 20, the connecting unit 30, the pull-out unit 50, and the optical measuring unit 60.

PULL-OUT UNIT 50

Figure 31:
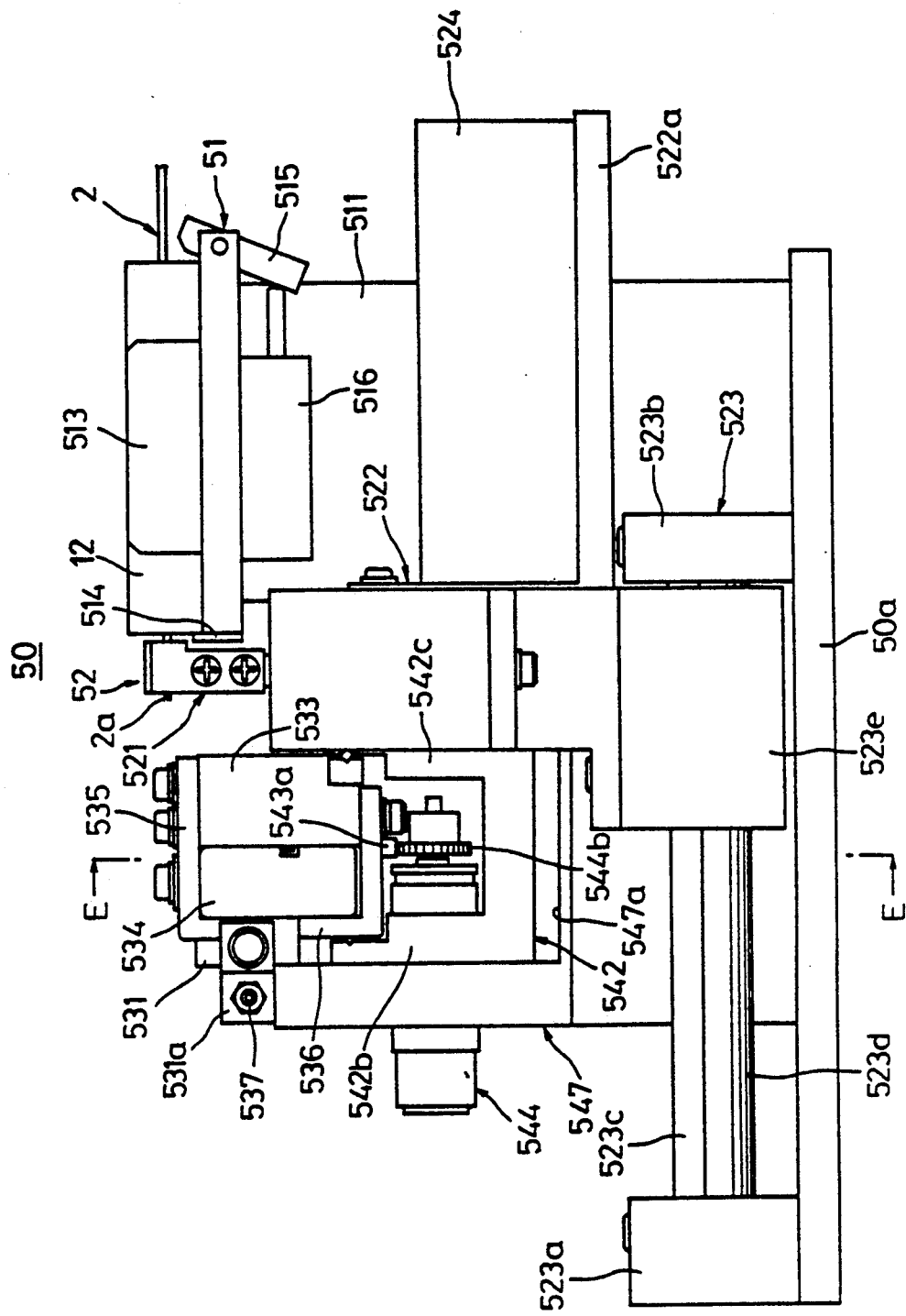
FIG. 31 is a front view of a pull-out unit in its home position.
Figure 32:
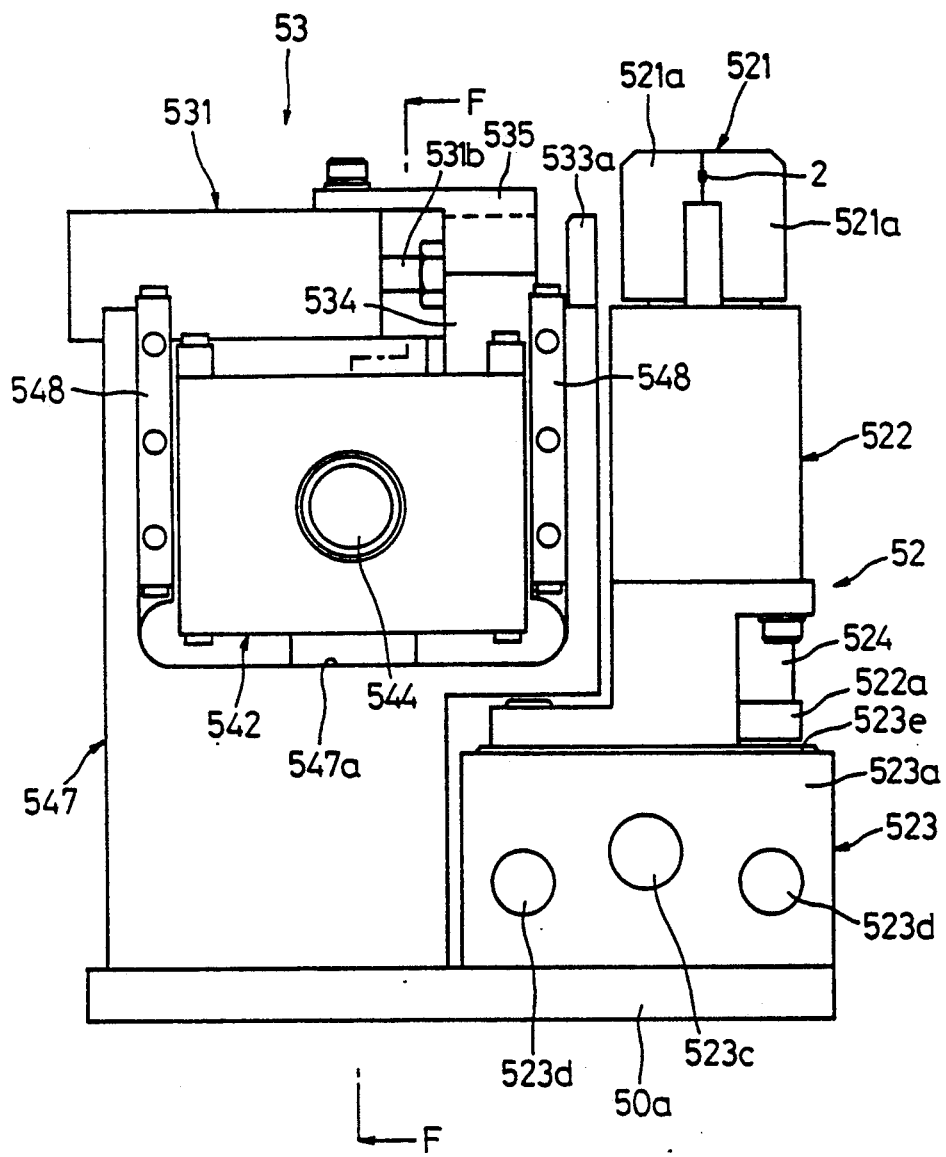
FIG. 32 is a side view of the pull-out unit of FIG. 31 observed from the left side.
Figure 33:
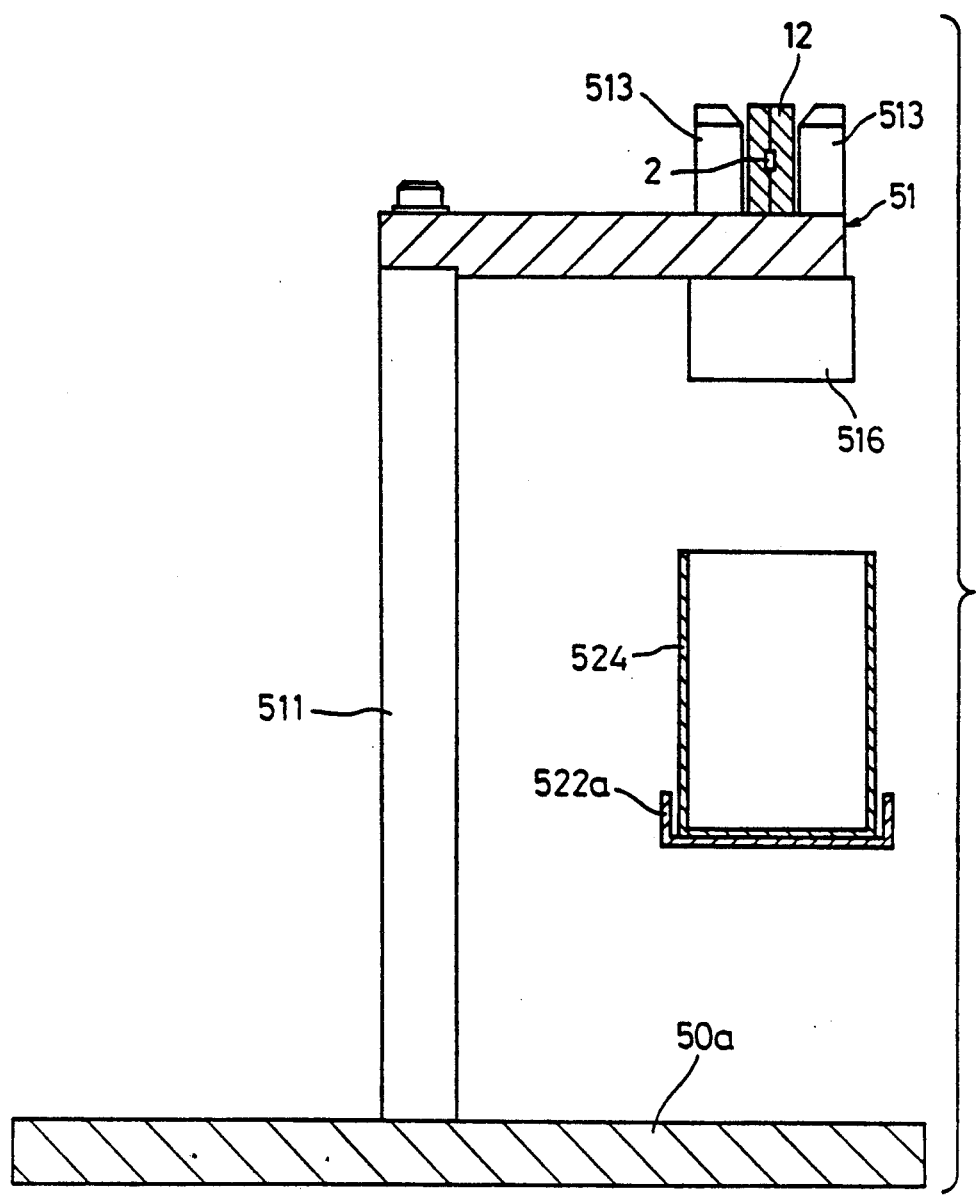
FIG. 33 is a cross-sectional view showing the major section of the pull-out unit.

As shown in FIG. 31 and FIG. 32, the pull-out unit 50 has a mounting base 51, a pull-out means 52, a cutting means 53, and a moving means 54. The drawings illustrate the state of the unit before it is actuated.

The mounting base 51, as shown in FIG. 31 and FIG. 32, is mounted on a support frame 511 which is installed lengthwise on one side of a base 50a, and mounting walls 513 and 513, on which the holder 12 is to be mounted, are installed widthwise on both sides of the mounting base 51. The inside top part of each mounting wall 513 is tapered to ensure smooth mounting of holders 12 carried by the carrying units 40 of the individual housings $L_1$ through $L_3$. Further, the mounting base 51 has a stopper 514 for the holder 12 at the front and an energizing arm 515, which pushes the back of the mounted holder 12 to move it forward, at the rear, both being installed in a manner that they are allowed to turn. At the bottom of the mounting base 51 is provided a push cylinder 516 which pushes the bottom part of the energizing arm 515.

The pull-out means 52 is designed to hold the jacketed optical fiber 2 held by the holder 12 to move it in the axial direction of the jacketed optical fiber 2, and pulls out the jacketed optical fiber 2 from the holder 12 against the magnetic holding force. As shown in FIG. 31 and FIG. 32, the pull-out means 52 has a pick-up head (hereinafter referred to as "head") 521, a support base 522 which supports the head 521, and a rodless cylinder (hereinafter referred to as "cylinder") 523 which moves the support base 522 along the length of the base 50a.

As shown in FIG. 32, the head 521 is designed to clamp the end of the jacketed optical fiber 2 by a pair of clamping hooks 521a and 521a, and it is installed on the top of the support base 522, the pair of clamping hooks 521a and 521a being driven by a cylinder which is not illustrated.

The support base 522 is installed on a slider 523e of the cylinder 523. A rest 522a is mounted on the surface closer to the support frame 511 at the rear, and on the rest 522a is mounted a waste basket 524 for receiving fiber wastes resulting from cutting the jacketed optical fiber 2.

The cylinder 523 is designed to move the support base 522 together with the head 521 along the length of the base 50a. A cylinder tube 523c and guide shafts 523d and 523d extend between end covers 523a and 523b. A slider 523e is supported by the tube 523c and the shafts 523d and 523d so that it is allowed to slide.

The cutting means 53 is designed to cut the jacketed optical fiber 2 pulled out from the holder 12 by the pull-out means 52 at a specified point, and it has, as shown in FIG. 31 and FIG. 34 through FIG. 36, a cut cylinder 531, a clamping members 532 and 533, and a cutting unit 534, the clamping member 532 and the cutting unit 534 being installed between guide plates 535 and 536, which are provided at top and bottom, in a manner that they can slide.

The cut cylinder 531 is designed to push the clamping member 532 in the direction of width of the base 50a, and it is installed on a slide table 543 of the moving means 54 to be discussed later. A bracket 531a, which is mounted at the rear, is provided with a fiber sensor 537 for checking the introduction of the jacketed optical fiber 2 into a gap C to be discussed later.

Figure 35:
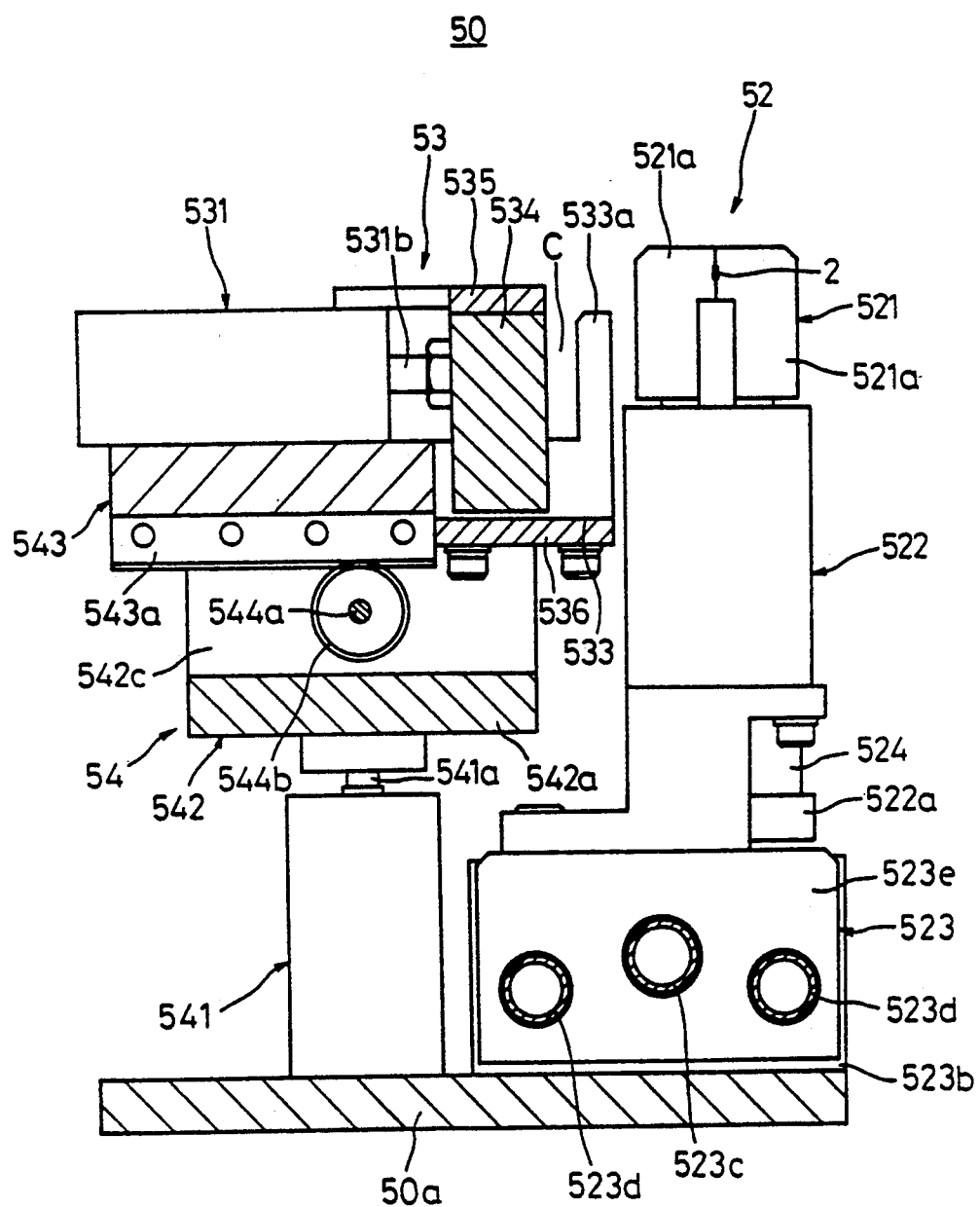
FIG. 35 is a cross-sectional view taken along the line E—E of FIG. 31.
Figure 36:
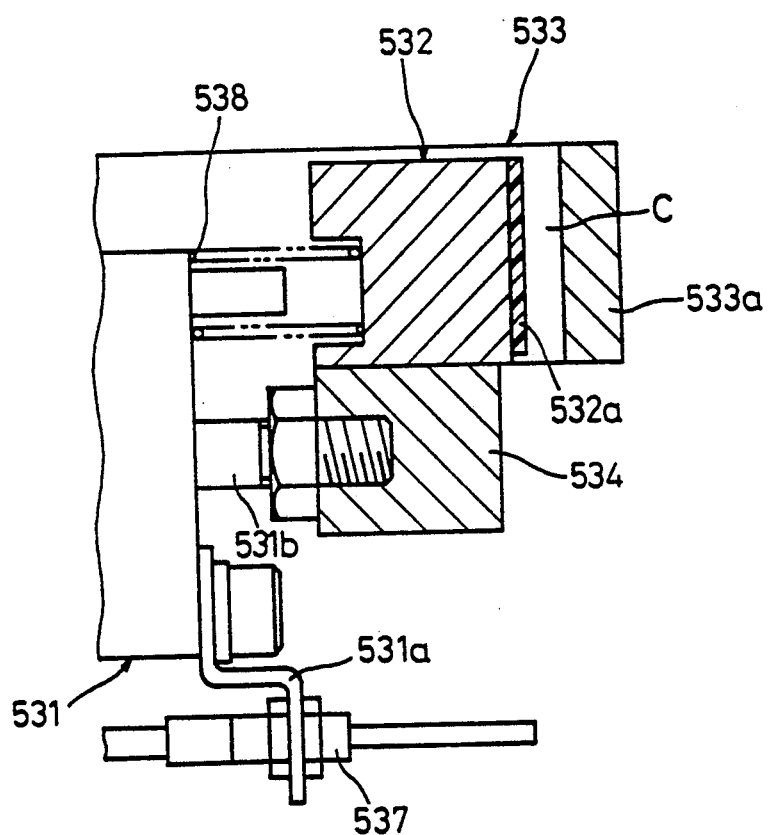
FIG. 36 is a cross-sectional plan view illustrating the cutting means.

The clamping members 532 and 533 are designed to clamp the jacketed optical fiber 2 pulled out of the holder 12 by the pull-out means 52. The clamping member 532, as shown in FIG. 36, has a frictional component 532a made of rubber or the like attached to the surface closer to a clamping wall 533a of the opposing clamping member 533, and it is energized toward the clamping wall 533a of the clamping member 533 by an energizing spring 538 provided between the clamping member 532 and the cut cylinder 531. The clamping member 533, as shown in FIG. 35, is an L-shaped member as observed from the side, and it is fixed on a guide plate 536. As shown in FIG. 35 and FIG. 36, the gap C for introducing the jacketed optical fiber 2 at the time of cutting is formed among the clamping wall 533a extending upward, the clamping member 532, and the cutting unit 534.

Figure 34:
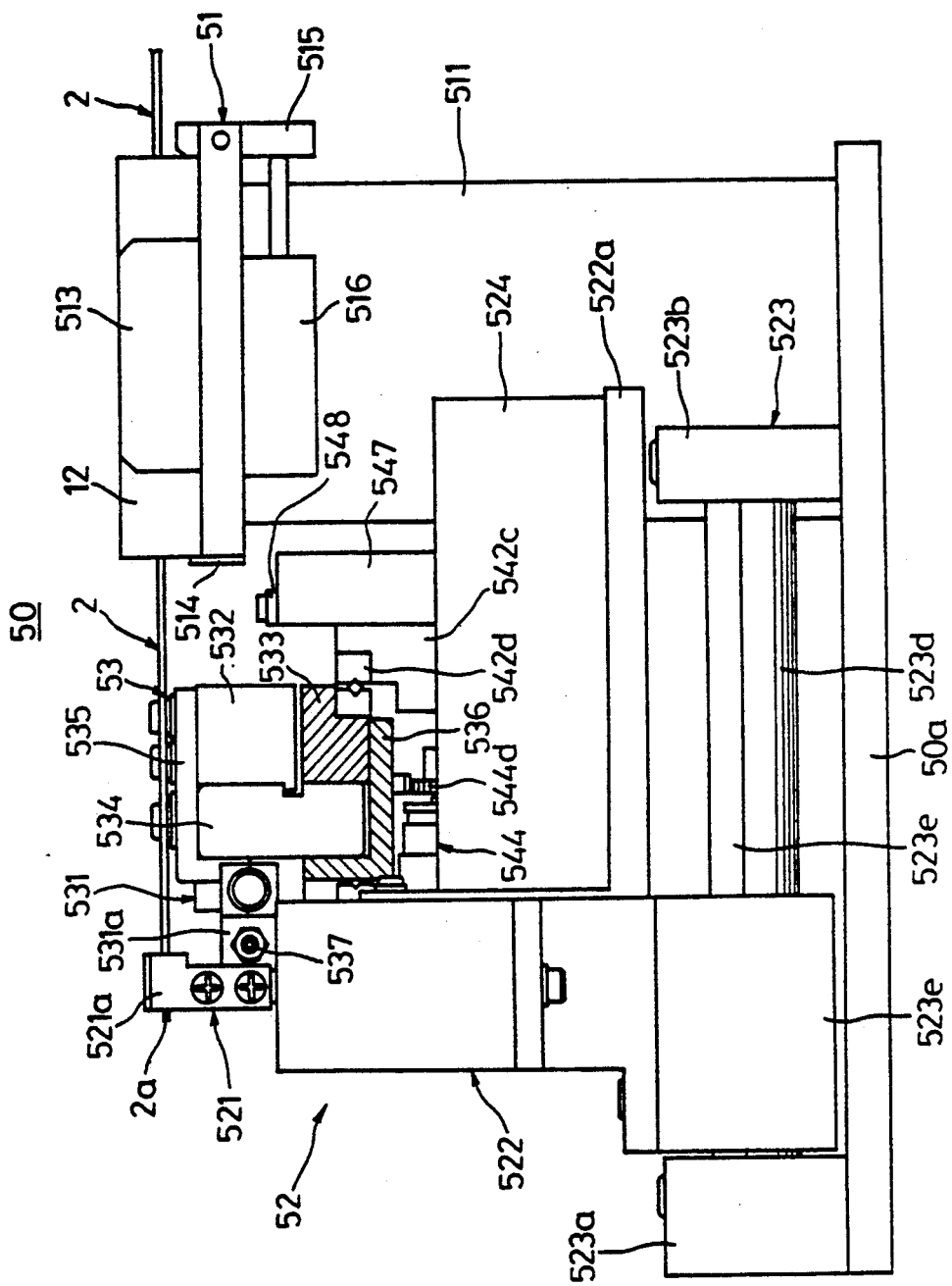
FIG. 34 is a front view, partially in cross-section, of the jacketed optical fiber drawn out.

The cutting unit 534, as shown in FIG. 35 and FIG. 36, is connected to the end of a rod 531b of the cut cylinder 531, and it is designed to cut the jacketed optical fiber 2 clamped by the clamping members 532 and 533, making use of a shearing force produced between the cutting unit 534 and the clamping wall 533a. As shown in FIG. 31 and FIG. 34, the top and bottom surfaces and the both side surfaces of the cutting unit are in contact with the guide plates 535 and 536, and the clamping members 532 and 533 so that it is advanced smoothly by the cylinder 531 at the time of cutting.

Figure 37:
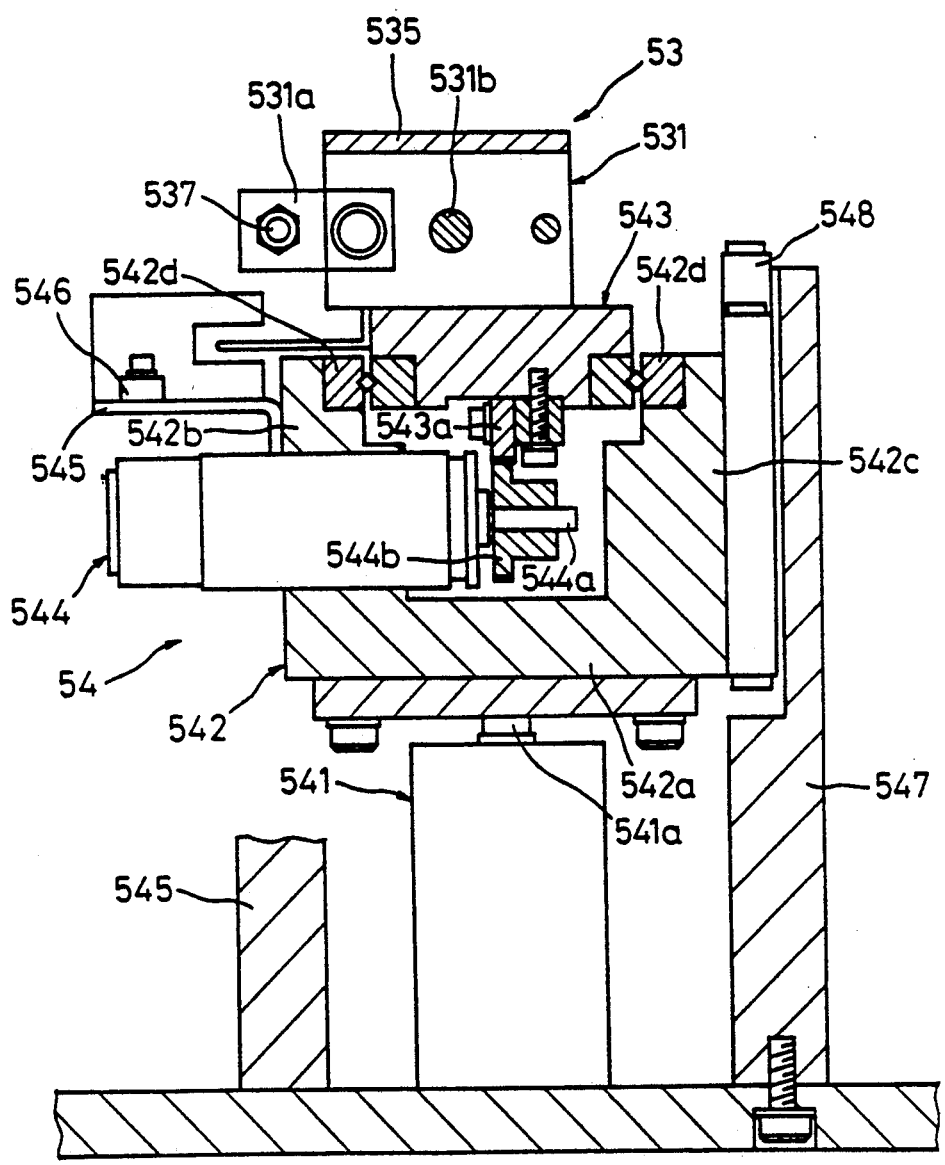
FIG. 37 is a cross-sectional view taken along the line F—F of FIG. 32.

The moving means 54 raises the cutting means 53 and moves it in the direction of the width of the base 50a; it has a lifting cylinder 541, a lifting base 542, and a slide table 543 as shown in FIG. 35 and FIG. 37.

The lifting cylinder 541 is installed nearly at the center of the base 50a, and it raises the lifting base 542 to a specified height.

The lifting base 542 is linked to the rod 541a of the cylinder 541 at the bottom part of a bottom wall 542a, and it has side walls 542b and 542c which extend widthwise. It is a concave component as observed from the side with its widthwise sides open, a driving motor 544 being installed horizontally on the side wall 542b. Further, on the side wall 542b is mounted a bracket 545 as shown in FIG. 37, and on the bracket 545 are mounted widthwise position checking sensors 546 and 546 (one of them is not illustrated) with a specified distance provided between them. The individual sensors 546 detect a position of a slide table 543 which moves widthwise and which is to be discussed later, and the operation of a driving motor 544 which drives the table 543 is controlled in accordance with the detected position.

The driving motor 544 is designed to slide the slide table 543 widthwise, and it is installed so that a rotary shaft 544a is positioned between the side walls 542b and 542c, a gear 544b being mounted on the rotary shaft 544a.

Inside the side walls 542b and 542c of the lifting base 542 are mounted guide members 542d and 542d such as cross rollers for guiding the slide table 543.

As shown in FIG. 31, FIG. 32, and FIG. 37, the lifting base 542 is enclosed by a support wall 547 which is provided around the lifting cylinder 541 of the base 50a, and its vertical motion is guided by a plurality of guide members 548 provided on the support wall 547. Also, the support wall 547 has openings 547a formed in the top part of the individual wall surfaces.

The slide table 543 has a rack gear 543a installed widthwise on the bottom surface, and it is mounted on the top of the lifting base 542 via guide members 542d and 542d in such a way that it is allowed to slide. Thus, the slide table 543 moves the cutting means 53 widthwise to the position of the jacketed optical fiber 2, which has been pulled out by the pull-out means 52, while it is guided by the guide members 542d and 542d driven by the gear 544b meshed with the rack gear 543a.

In the above-mentioned pull-out unit 50, if the tip of the jacketed optical fiber 2 has been defectively processed by the tip processing unit 30 in the preceding process with a resultant problem such as the tip not being separated into a plurality of optical fibers 2a and the optical fibers 2a not being trimmed uniformly, then the carrying unit 40 carries the holder 12 holding the defectively processed jacketed optical fiber 2 to the pull-out unit 50 and mounts it between the mounting walls 513 and 513 of the mounting base 51.

Then, the push cylinder 516 is actuated to press the bottom part of the energizing arm 515, thus pushing the rear of the holder 12 forward to bring it into contact with the stopper 514. This locates the holder 12 in a proper position on the mounting base 51.

Next, the pull-out means 52 is actuated, and a pair of clamping hooks 521a and 521a of the head 521 clamps the end of the jacketed optical fiber 2. Then the cylinder 523 is actuated to move the slider 523e toward the end cover 523a along the cylinder tube 523c and the guide shafts 523d and 523d. This causes the head 521 to move together with the support base 522 in the direction of the length of the base 50a, i.e., in the direction of the axis of the jacketed optical fiber 2, and pulls out the jacketed optical fiber 2 held in the holder 12 by a specified length against the magnetic holding force as shown in FIG. 34.

When pulling out the jacketed optical fiber 2 from the holder 12 is completed, the moving means 54 is actuated, and the driving motor 544 moves the slide table 543 widthwise toward the pull-out means 52 by a specified distance. At this time, the position of the slide table 543 is monitored by the position checking sensors 546 and 546 provided on the bracket 545. In this way, the cutting means 53 is moved to a position right below the jacketed optical fiber 2 pulled out of the holder 12.

Subsequently, the lifting cylinder 541 is actuated to raise the lifting base 542, and the jacketed optical fiber 2 is guided into the gap C which is formed among the clamping wall 533a of the cutting means 53, the clamping member 532, and the cutting unit 534. The introduction of the jacketed optical fiber 2 into the gap C is checked by the fiber sensor 537.

After that, the cutting means 53 is actuated, the rod 531b of the cut cylinder 531 is drawn out, and the cutting unit 534 is pushed out together with the clamping member 532 toward the clamping wall 533a of the clamping member 533. This causes the jacketed optical fiber 2 to be clamped by the frictional component 532a and the clamping wall 533a due to the energizing force from the energizing spring 538. Then the cutting unit 534 is further pushed out, and the jacketed optical fiber 2 is cut by using a shearing force produced between the cutting unit 534 and the clamping wall 533a.

In this way, the jacketed optical fiber 2 is cut to restore an unprocessed tip, making it ready for retrying the tip processing. The fiber wastes resulting from cutting the jacketed optical fiber 2 are put in the waste basket 524 which is placed on the rest 522a at the rear of the support base 522 and which is located right below the cutting means 53 as shown in FIG. 34.

Thus, when the pull-out unit 50 has completed the processing on the jacketed optical fiber 2, the mounting base 51, the pull-out means 52, the cutting means 53, and the moving means 54 are reset to the initial states in the reverse order of the foregoing sequence. Also, the jacketed optical fiber 2, which has been pulled out to the length before the tip processing, is carried together with the holder 12 holding the jacketed optical fiber 2 to the tip processing unit 20 by the carrying unit 40 for retrying the tip processing.

OPTICAL MEASURING UNIT 60

The optical measuring unit 60 is used for measuring the jacketed optical fiber 2 by the cutback method. It is designed to measure the intensity of the measuring light transmitted through the jacketed optical fiber 2, and it uses, for instance, an optical power meter or the like. The individual optical measuring units 60 are arranged as shown in FIG. 6 in the automatic optical measuring apparatus 1. One end of the jacketed optical fiber 2 is connected to the optical measuring unit 60 of the first housing $H_1$, while the other end of the jacketed optical fiber 2 is connected to the light source $L_s$ in the connecting unit 30 of the second housing $H_2$. The cut end of the jacketed optical fiber 2, which is cut near the second housing $H_2$, is transferred to and held by the holder 12 arranged on the holder pallet 11 of the third housing $H_3$ as illustrated, and it is connected to the optical measuring unit 60 installed in the third housing $H_3$.

Accordingly, one end of the jacketed optical fiber 2 to be measured is connected to the optical measuring unit 60 of the first housing $H_1$, while the other end is connected to the light source $L_s$ of the connecting unit 30 of the second housing $H_2$ as shown in FIG. 6. This makes it possible to measure a transmission loss of the total length of the jacketed optical fiber 2.

Next, in the first housing $H_1$, the holder 12 holding one end of the jacketed optical fiber 2 is carried to the connecting unit 30 by the carrying unit 40, and the end of the jacketed optical fiber 2 is connected to the OTDR.

In the second housing $H_2$, the other end of the jacketed optical fiber 2 is hauled in by a specified length and cut. The cut end of the cut optical fiber 2, which is connected to the light source $L_s$, is connected to the optical measuring unit 60 of the third housing $H_3$ to measure the intensity of the measuring light coming from the light source $L_s$. Based on both measurement results, a transmission loss of the jacketed optical fiber 2 is determined.

HAUL-IN UNIT 70 AND HAND-OVER UNIT 80

The haul-in unit 70 is provided in the second housing $H_2$, and as shown in FIG. 4, it is equipped with a haul-in cylinder 72 mounted on guide rails 71 and 71 which are installed lengthwise on the bottom surface of a support base plate 6, a lifting cylinder 73 provided on the end of a shaft 72a of the haul-in cylinder 72, a pair of chucks 74 and 74, and a fiber cutting unit 75. The chucks 74 and 74, and the fiber cutting unit 75 are installed on a lifting table 76 provided on the top end of the shaft 73a of the haul-in cylinder 73. The haul-in cylinder 72 is moved lengthwise by a driving belt 77 which is installed on a driving motor and pulley, which are not illustrated, with its middle part fixed at the approximate center of the haul-in cylinder 72.

The hand-over unit 80 takes up the cut end of the jacketed optical fiber 2 cut by the haul-in unit 70, which cut end is positioned close to the light source $L_s$. As shown in FIG. 4, the hand-over unit 80 is provided on one side of a top plate 5 of the third housing $L_3$. The hand-over unit 80 is equipped with a lifting cylinder 82 installed via a guide rail 81 in a manner that it can slide, a rotary actuator (hereinafter referred simply to "actuator") 83 which is moved up and down by the lifting cylinder 82, a cylinder 84 which is installed under the actuator 83, a mounting base 85 provided under the cylinder 84, and a chuck device 86. The mounting base 85 is provided with a pair of chucks 87 and 87 mounted facing downward. In the hand-over unit 80, the lifting cylinder 82 is slid lengthwise along one side of the top plate 5 by a driving means, which is not illustrated, while it is guided by a guide rail 81.

The chuck device 86 has a lifting cylinder 86a, a push cylinder 86b installed above the lifting cylinder 86a, and a chuck 86c which is attached to the end of the push cylinder 86b. The lifting cylinder 86a is mounted on a slide table 41 of the carrying unit 40 provided in the second housing $H_2$, and it protrudes into the third housing $H_3$ through an opening 5a which is formed lengthwise in the top plate 5 that separates the second housing $H_2$ from the third housing $H_3$. Accordingly, the chuck device 86 is moved lengthwise as the carrying unit 40 provided in the second housing $H_2$ moves. The chuck 86c holds the cut end of the jacketed optical fiber 2, and works in cooperation with a pair of chucks 87 and 87 so that the cut end of the jacketed optical fiber 2 is held by the holder 12 arranged on the holder pallet 11 provided in the third housing $H_3$.

FIG. 4 shows the initial positions and state of the haul-in unit 70 and the hand-over unit 80.

CONTROLLING UNIT 90

The controlling unit 90 is designed to perform control so that the all units described above automatically operate in accordance with preestablished operating procedures; it mainly includes an arithmetic operation function, a storing function, and a judging function. It uses an electronic control unit, for example.

The automatic optical measuring apparatus 1 for optical fibers according to the present invention has the above-mentioned configuration, and it carries out measurement of the jacketed optical fiber 2 according to the cutback method and backscattering method in parallel as described below.

First, the carrying unit 40 of the first housing $H_1$ clamps the first holder 12 arranged on the holder pallet 11 by the hand chucks 43d and 43d, and carries it to the tip processing unit 20.

One end of the first jacketed optical fiber 2 is processed at the tip processing unit 20. Upon completion of the tip processing, the carrying unit 40 carries the holder 12 holding the jacketed optical fiber 2 with its one end processed to the optical measuring unit 60 wherein the one end of the jacketed optical fiber 2 is butt-connected.

If the tip processed by the tip processing unit 20 is found defective, then the holder 12 is transferred to the pull-out unit 50 which pulls out the end of the first jacketed optical fiber 2 from the holder 12 and cut it so that retry of the tip processing can be conducted.

Next, the carrying unit 40 of the second housing $H_2$ clamps the first holder 12 arranged on the holder pallet 11 by the hand chucks 43d and 43d, and carries it to the tip processing unit 20 to process the other end of the first jacketed optical fiber 2 in the same manner.

The carrying unit 40 then carries the holder 12 holding the other end of the first jacketed optical fiber 2 to the connecting unit 30 to connect the other end to the light source $L_s$ via the dummy fiber $F_{D2}$ as shown in FIG. 6.

Thus, the first jacketed optical fiber 2, in its full length, now has its one end connected to the optical measuring unit 60 and the other end connected to the light source $L_s$ at the connecting unit 30 of the second housing $H_2$, thereby measuring, by the optical measuring unit 60, the intensity of the measuring light transmitted from the light source $L_s$.

If the other processed end of the first jacketed optical fiber 2 is found defective in the second housing $H_2$, the holder 12 holding the first jacketed optical fiber 2 is also carried to the pull-out unit 50 of the second housing $H_2$ to undergo the cut processing in the same manner as described above.

When the measurement on the full length of the first jacketed optical fiber 2 is completed, the first jacketed optical fiber 2 is hauled in by the specified length and cut at the second housing $H_2$ side. At this time, in the haul-in unit 70, the shaft 73a of the lifting cylinder 73 is drawn out, the chunks 74 and 74 and a fiber cutting unit 75 move up to the height of the first jacketed optical fiber 2, the chucks 74 and 74 are released, and the fiber cutting unit 75 is set ready for cutting the first jacketed optical fiber 2.

Then, the shaft 72a of the haul-in cylinder 72 is drawn out by a specified length (approximately 2 or 3 m), and both chucks 74 grip the first jacketed optical fiber 2.

Figure 38:
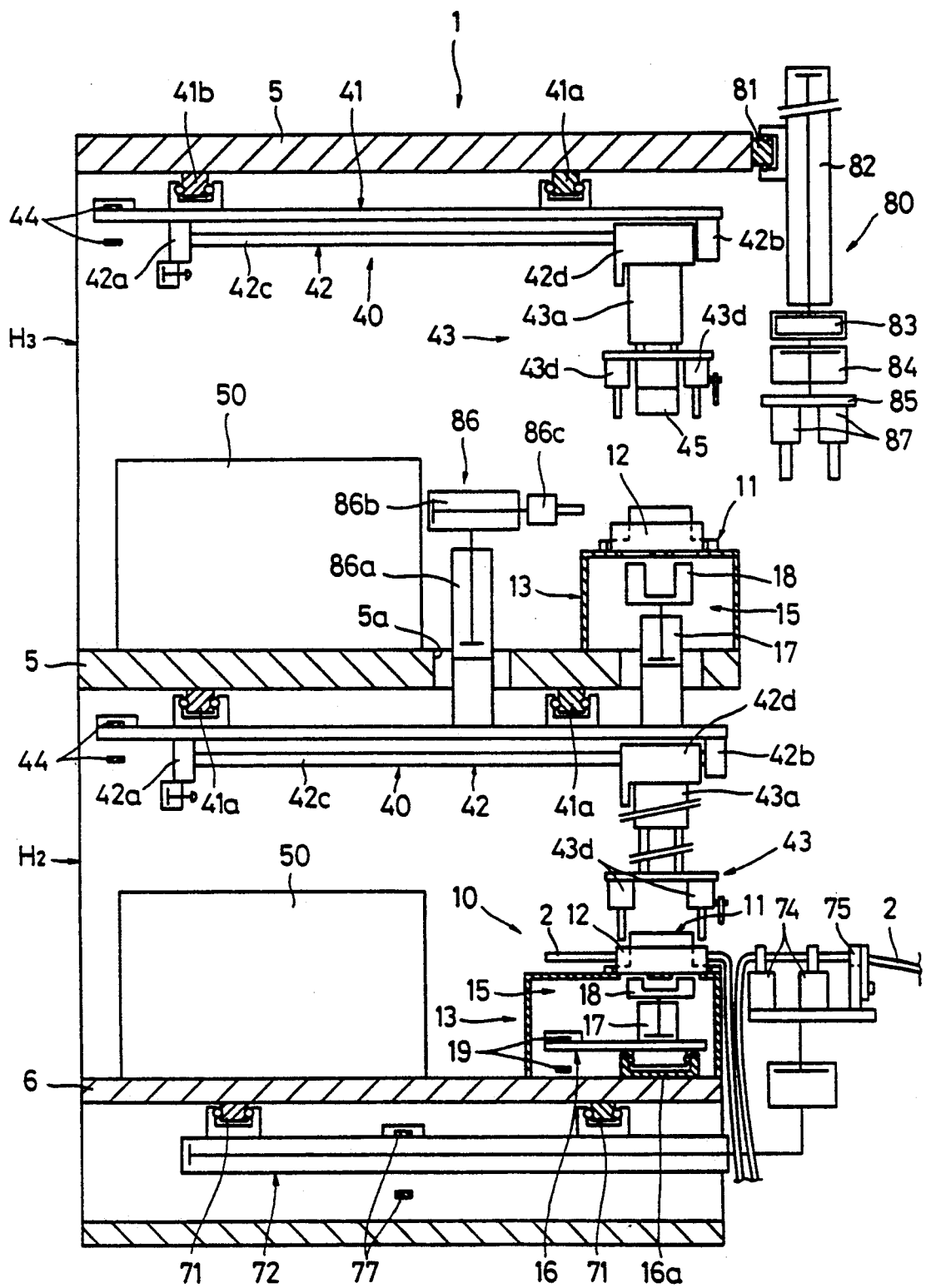
FIG. 38 is a cross-sectional view illustrating the jacketed optical fiber being hauled in at the third housing when the jacketed optical fiber is measured according to the cutback method.

After that, the shaft 72a is drawn back, and the lifting table 76 is drawn back to its home position. In this way, the first jacketed optical fiber 2 is hauled into the second housing $H_2$ by the specified length as shown in FIG. 38.

Figure 39:
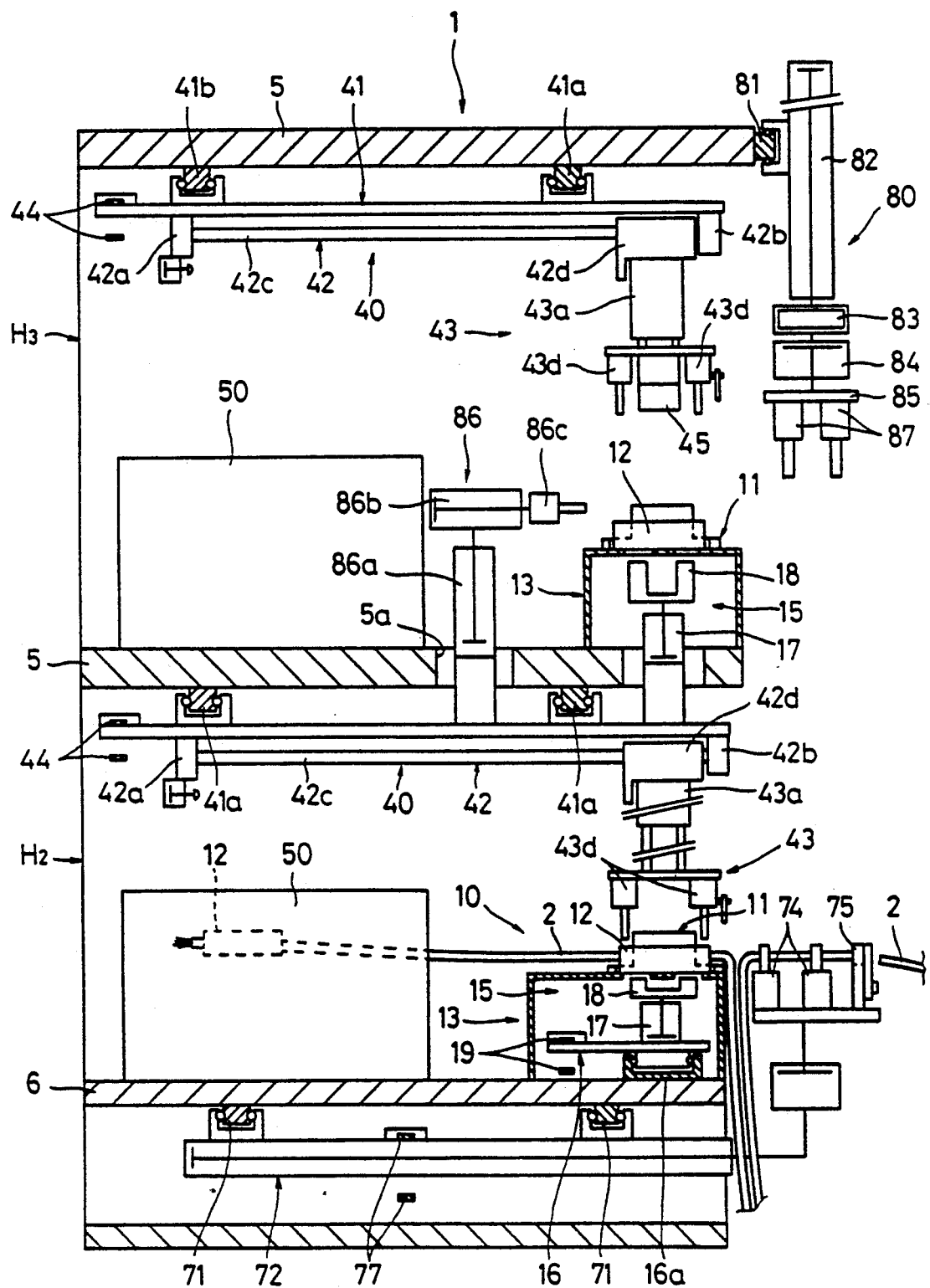
FIG. 39 is a cross-sectional view illustrating the jacketed optical fiber cut on the second housing side.

Next, the first jacketed optical fiber 2 is cut by the fiber cutting unit 75 as illustrated in FIG. 39. This divides the first jacketed optical fiber 2 into a short section which ranges from 1 to 2 meters on the haul-in unit 70 side and a long section which extends over a few kilometers on the first housing $H_1$ side.

Figure 40:
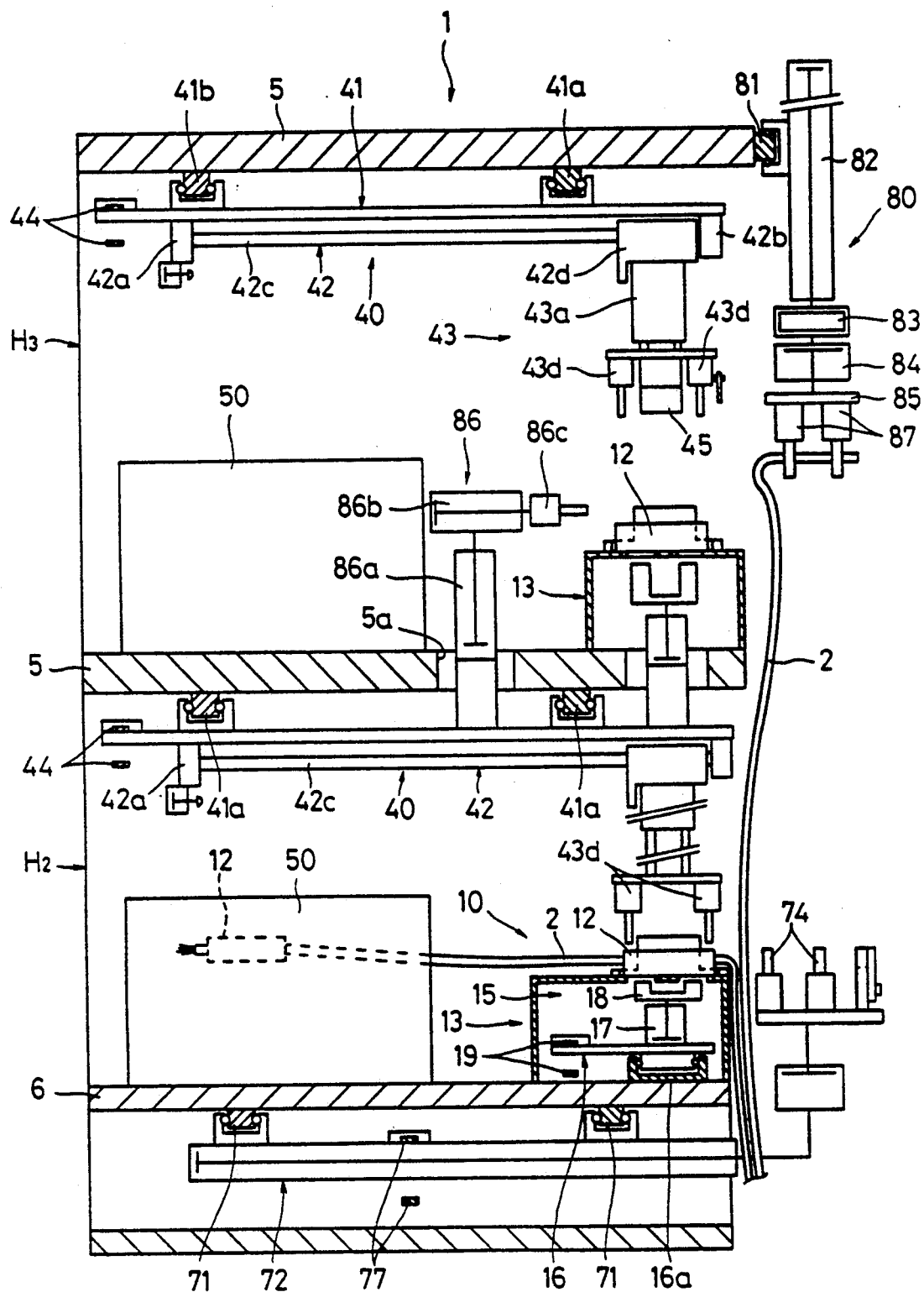
FIG. 40 is a cross-sectional view illustrating the cut jacketed optical fiber handed over to the third housing side.

Then, the hand-over unit 80 is actuated, and the chucks 87 and 87 are lowered by the lifting cylinder 82 to grip the short jacketed optical fiber 2 on the haul-in unit 70 and pull up the short jacketed optical fiber 2 as illustrated in FIG. 40. At the same time, the lifting means 15 of the third housing $H_3$ is actuated, and the push assembly 18 raises the first holder 12 placed on the holder pallet 11.

Figure 41:
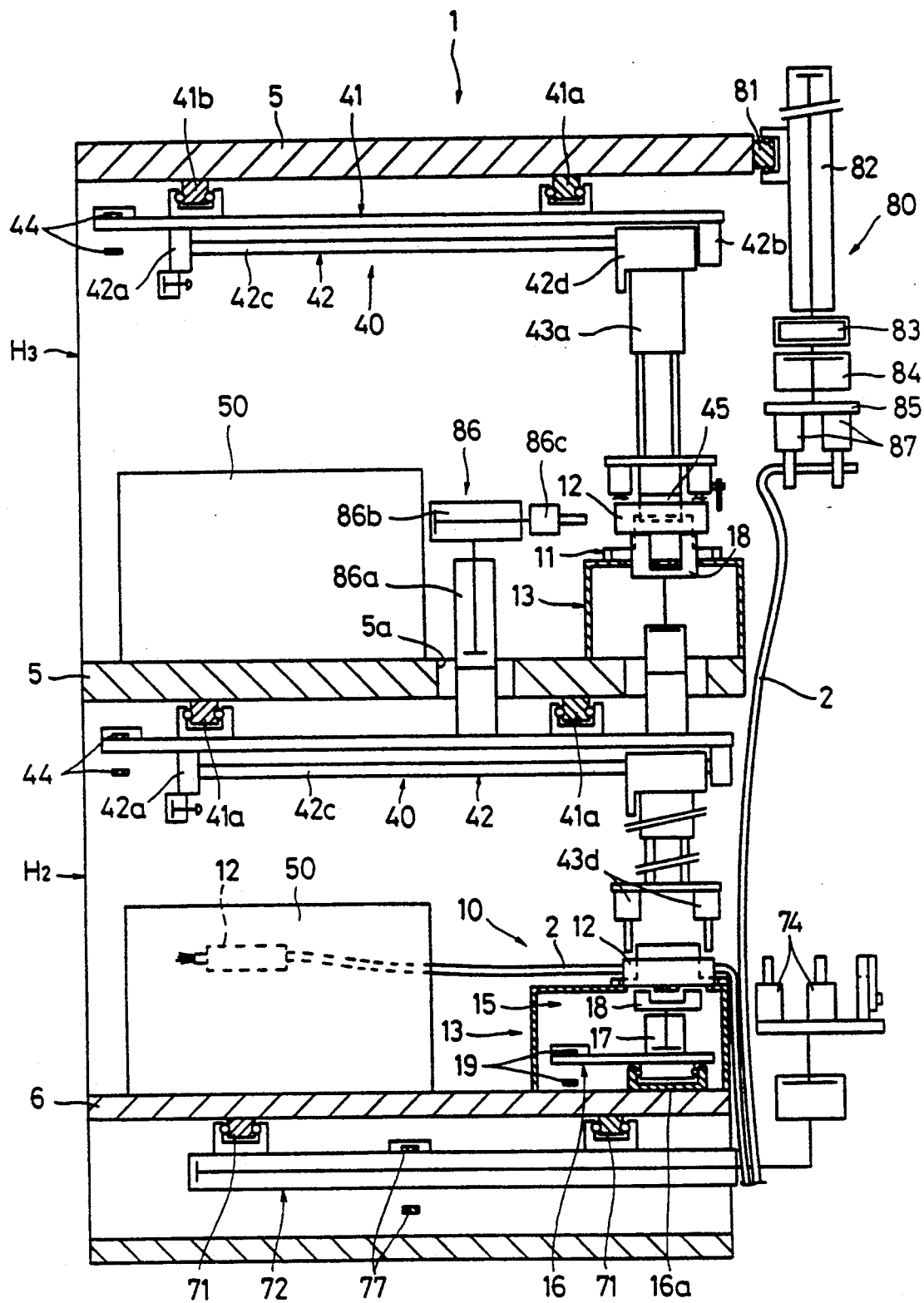
FIG. 41 is a cross-sectional view of a condition where the holder, which is arranged on a holder pallet of the third housing, is being opened.

After that, the carrying unit 40 of the third housing $H_3$ is actuated, and the hand chucks 43d and 43d of the clamping means 43 come down with the wedge 45, as shown in FIG. 41, and push open the first holder 12 on the holder pallet 11 against the magnetic force.

Figure 42:
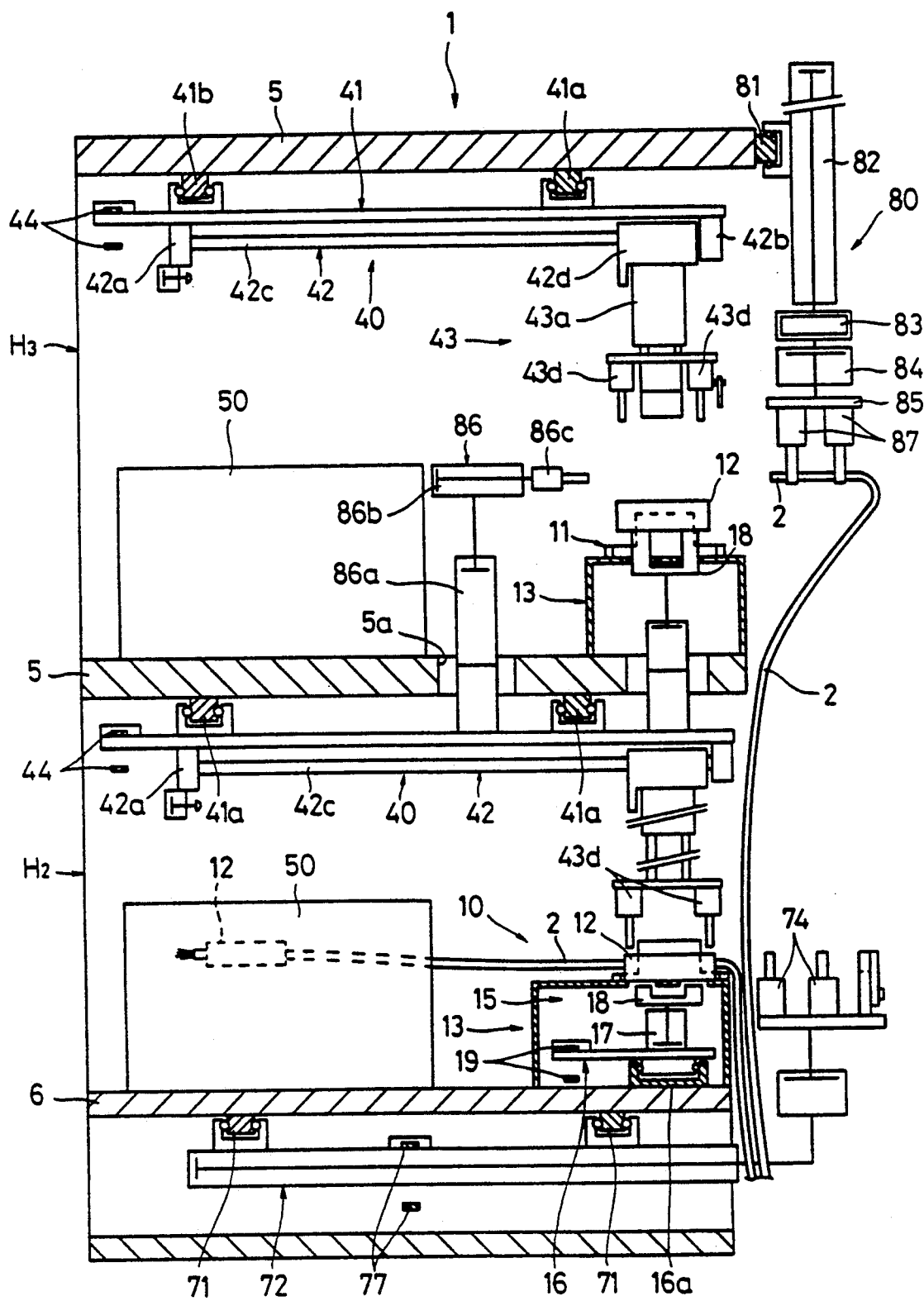
FIG. 42 is a cross-sectional view of a state where the orientation of the jacketed optical fiber handed onto the third housing side has been changed.

Next, the hand chucks 43d and 43d go up with the wedge 45, and the actuator 83 is actuated to turn the cylinder 84 together with the installing base 85 by 180 degrees so that the cut end of the short jacketed optical fiber 2 held by the chucks 87 and 87 faces toward the chuck device 86 as shown in FIG. 42. At this time, while the actuator 83 works, the chuck device 86 also works to raise the lifting cylinder 86a so that the push cylinder 86b moves up to a height to match the short jacketed optical fiber 2 as illustrated.

Figure 43:
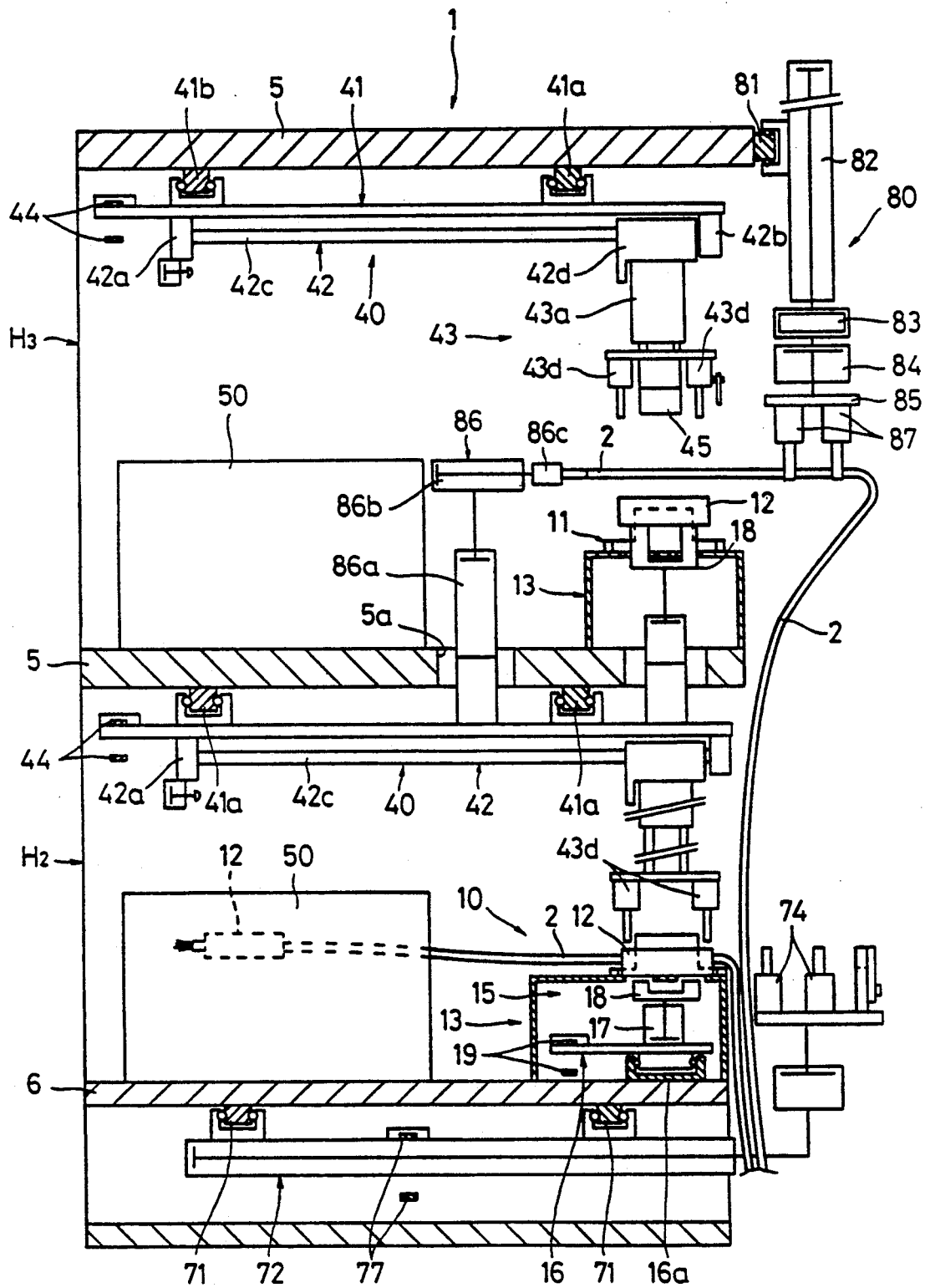
FIG. 43 is a cross-sectional view of the jacketed optical fiber in the new orientation which has been drawn out onto the holder of the third housing.

Then, the chuck 86c of the chuck device 86 grips the cut end of the short jacketed optical fiber 2, and pulls out the short jacketed optical fiber 2 to a point right above an opened holder 12 as illustrated in FIG. 43.

Figure 44:
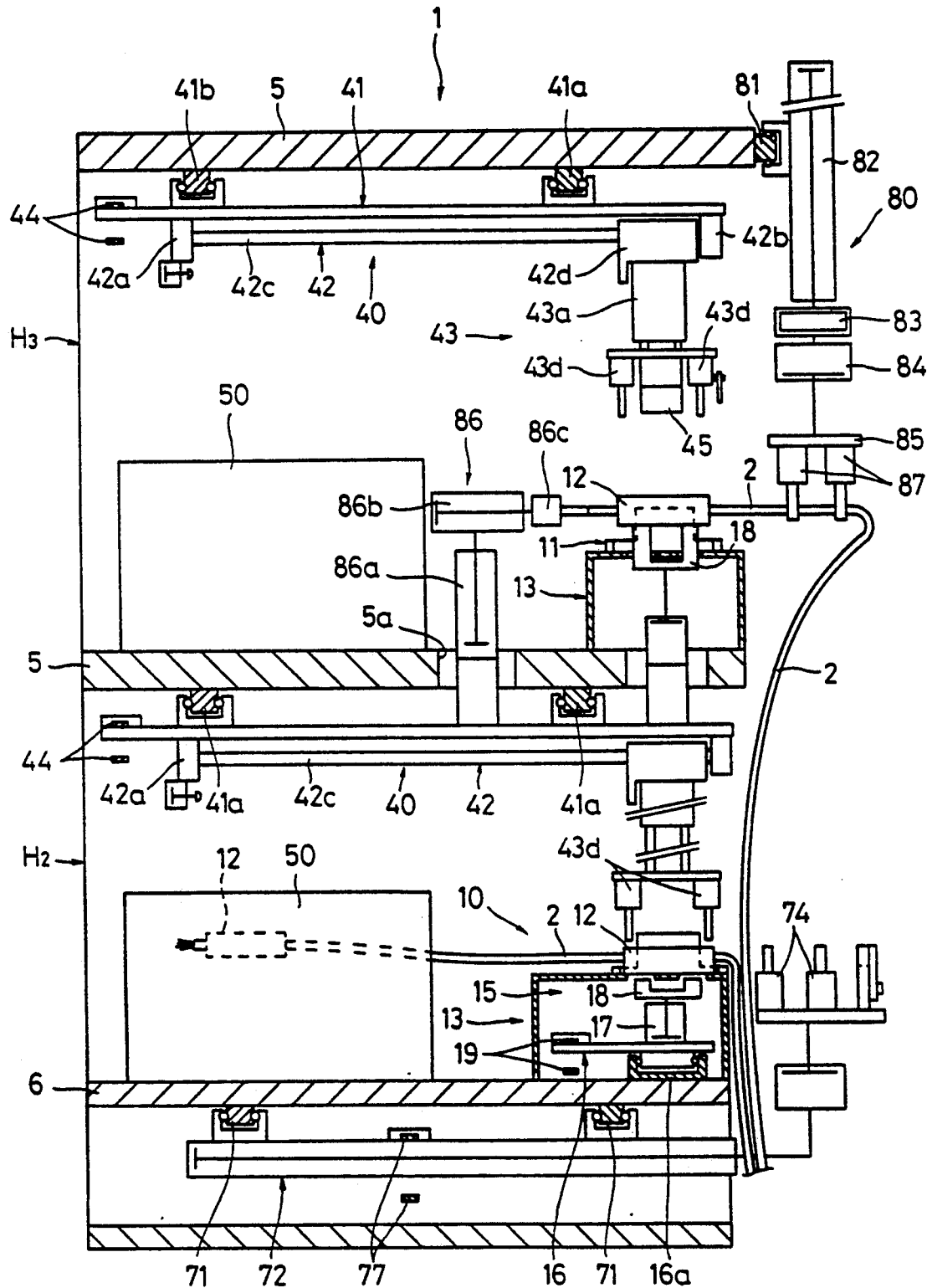
FIG. 44 is a cross-sectional view of a state where the jacketed optical fiber, which has been drawn out, in placed in the holder.

After that, the cylinder 84 of the hand-over unit 80 and the lifting cylinder 86a of the chuck device 86 lower the installing base 85 and the push cylinder 86b, respectively, and the short jacketed optical fiber 2 held by the chucks 87 and 87 and the chuck 86c is placed in the opened holder 12 as shown in FIG. 44.

Figure 45:
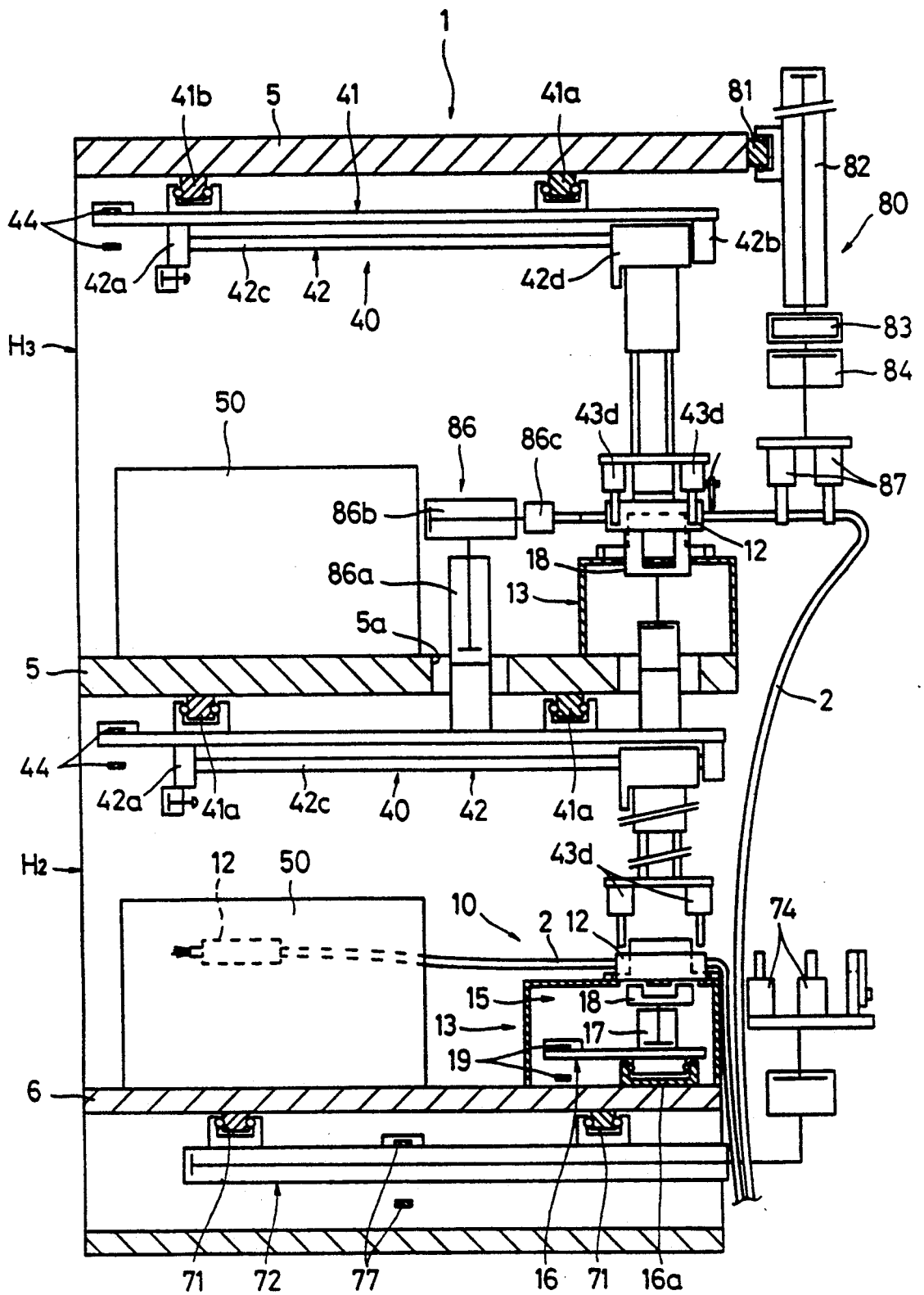
FIG. 45 is a cross-sectional view of the holder of FIG. 44 in its closed state.

The chucks 43d and 43d are lowered by the clamping means 43 of the carrying unit 40, and as shown in FIG. 45, the chucks 43d close the opened holder 12 so that the holder holds the cut end of the short jacketed optical fiber 2 and clamps the holder 12.

The carrying unit 40 carries, together with the short jacketed optical fiber 2, the holder 12 clamped by the chucks 43d and 43d to the optical measuring unit 60 of the third housing $H_3$. One end of the cut, short jacketed optical fiber 2 is connected to the light source $L_s$ at the connecting unit 30 of the second housing $H_2$, while the cut end is connected to the optical measuring unit 60 of the third housing $H_3$. Thus, the intensity of the measuring light transmitted through the connected short jacketed optical fiber 2 is measured by the optical measuring unit 60 of the third housing $H_3$.

In this way, the transmission loss of the first jacketed optical fiber 2 is measured by the cutback method according to both measurement results. When the measurement on the first jacketed optical fiber 2 is completed, the carrying units 40 of the housings $H_2$ and $H_3$ bring the holders 12 back to their original positions on the holder pallets 11.

Meanwhile, in parallel to the measurement on the first jacketed optical fiber 2 according to the foregoing cutback method, another measurement based on the backscattering method is performed using the cut, long jacketed optical fiber 2.

To be specific, as shown in FIG. 6, the carrying unit 40 of the first housing $H_1$ carries the holder 12, holding the first jacketed optical fiber 2 connected to the optical measuring unit 60, to the connecting unit 30. Thus, one end of the jacketed optical fiber 2, which is held on the holder 12 and which is a few kilometers long, is connected to the OTDR via the dummy fiber $F_{D1}$ to measure the transmission loss. At this time, the jacketed optical fiber 2 held on the holder 12 is the long one extending over a few kilometers, and the other end is cut by the haul-in unit 70 to be a free end when conducting the measurement based on the cutback method.

When the measurement based on the backscattering method is completed, the carrying unit 40 brings the holder 12 holding one end of the jacketed optical fiber 2 to its original position on the holder pallet 11.

In the automatic optical measuring apparatus 1 for optical fibers, the optical measurement on the second optical fiber 2 and after is performed automatically in the same way at the first housing $H_1$ through the third housing $H_3$, thus conducting the optical measurement of the transmission loss and the like of each jacketed optical fiber.

In the automatic optical measuring apparatus for optical fibers described in the foregoing embodiment, the explanation was given to a case where the measurement based on the cutback method and that based on the backscattering method for multiple jacketed optical fibers are performed in parallel. However, the automatic optical measuring apparatus according to the present invention is also capable of performing only type of measurement rather than performing both types of measurements mentioned above.

Additionally, the automatic optical measuring apparatus according to the foregoing embodiment is equipped with the first through the third pull-out units, however, the pull-out units are unnecessary if the tips of jacketed optical fibers are processed successfully by the tip processing units.

Further, both embodiments described above refer to a case where the jacketed optical fibers are multi-core fibers (fiber ribbons), but single-core optical fibers are, of course, applicable also.

What is claimed is:

1. An automatic optical measuring apparatus for optical fibers which is designed to automatically perform a series of steps from a processing of tips to an optical measurement of a plurality of jacketed optical fibers each comprising at least one optical fiber provided with a jacket, which apparatus comprising:

first and second array units wherein a plurality of first and second holders are arranged, each holder holding an end of the jacketed optical fiber to be subjected to optical measurement in such a manner that the jacketed optical fiber protrudes by a specified length, and a third array unit wherein a plurality of third holders are arranged;

first through third tip processing units for processing the ends of said individual jacketed optical fibers;

a first optical measuring unit to which one end of the jacketed optical fiber, held by the first holder, with its end processed is connected;

a first connecting unit for connecting the one end of said jacketed optical fiber held by the first holder to the optical measuring apparatus;

a second connecting unit which connects the other end of said jacketed optical fiber, held by the second holder, with its end processed to a light source;

a first carrying unit which carries said first holder from said first array unit to said first tip processing unit, the first optical measuring unit, and the first connecting unit, then returns it to said first array unit;

a haul-in unit which hauls in and cuts a specified length of the jacketed optical fiber held in said second holder on said first holder side;

a second carrying unit which carries said second holder from said second array unit to said second tip processing unit and the second connecting unit, then returns it to said second array unit;

a hand-over unit which hands over the cut end of said jacketed optical fiber on the second holder side, which was cut by said haul-in unit, onto said third holder with a specified length of the cut end jutting out;

a second optical measuring unit to which the cut end of said jacketed optical fiber, which has been transferred onto said third holder, on said second holder side is connected;

a third carrying unit which carries said third holder from said third array unit to said third tip processing unit and the second optical measuring unit, the returns it to said third array unit; and a controlling unit which controls the operations of all the aforementioned component units.

2. The automatic optical measuring apparatus for optical fibers according to claim 1, which comprises first through third pull-out units which pull out the jacketed optical fiber held in each of said first through third holders by a specified length if the end of the optical fiber processed by each of said first through third tip processing units is defective, and said each first through third carrying unit carries said first through third holder from said individual first through third tip processing units so that said pull-out units pull out the jacketed optical fiber by the specified length, then carry said each holder back to the tip processing unit.

3. The automatic optical measuring apparatus for optical fibers according to claim 2, wherein said first through third pull-out units are provided with mounting bases on which the first through third holders holding said jacketed optical fibers with their ends protruding by a specified length are mounted, and pull-out means which are located near said mounting bases and which clamp the jacketed optical fibers held on said holders, move them in the direction of the axis of the jacketed optical fibers, and pull out the jacketed optical fibers from said individual holders.

4. The automatic optical measuring apparatus for optical fibers according to claim 1, wherein said first through third array units are provided with pallets, on which said holders are placed, and a lifting means, said pallets being provided with openings for pushing said holders upward by the lifting means, which openings are provided under the arranged individual holders.

5. The automatic optical measuring apparatus for optical fibers according to claim 1, wherein said first and second optical measuring units are optical power meters.

6. The automatic optical measuring apparatus for optical fibers according to claim 1, wherein said first and second connecting units are equipped with butting assemblies which have connecting grooves for inter-butting optical fibers for connection, and a pair of mounting bases, which are located on both sides of said butting assemblies and on one of which is mounted the holder holding a dummy fiber connected to said optical measuring apparatus of said light source, while the other of which is arranged so that it can be moved toward and away from said butting assemblies, and on which are mounted said first and second holders holding said jacketed optical fibers, the connecting units being designed so that the optical fibers of said two fibers are inter-butt for connection in the connecting grooves of said butting assemblies.

7. The automatic optical measuring apparatus for optical fibers according to claim 1, wherein said first through third carrying units are equipped with a slider which is moved lengthwise by a slide mechanism and a driving belt, a traverse means which is installed on the bottom surface of said slider and which moves in a widthwise direction that orthogonally intersects with the moving direction of the slider, and a clamping means which is supported by said traverse means and which clamps holders arranged in the first through third array units, the carrying units being designed to move in three axial directions of vertical, lateral and longitudinal directions, to carry the holders arranged in the array units to desired positions.

8. The automatic optical measuring apparatus for optical fibers according to claim 1, wherein said haul-in unit is provided with a haul-in means which is located in the vicinity of said second array unit, and which pulls out and pulls back in a specified length of said jacketed optical fiber extending from said holder placed in said second array unit, a lifting mans which is provided at the pull-out end of said haul-in means which is allowed to move up and down, a clamping means which is moved up and down by said lifting means and which clamps the jacketed optical fiber, and a cutting means which clamps the jacketed optical fiber by said clamping means and cuts said jacketed optical fiber which is hauled in by said haul-in means for the specified length.

9. The automatic optical measuring apparatus for optical fibers according to claim 1, wherein said hand-over unit is provided with a lifting means which is allowed to move up and down, a clamping means which clamps a cut end of said jacketed optical fiber on the second holder side which has been cut by said cutting means, and a turning means that is moved up and down by said lifting means and that turns on a surface orthogonally intersecting the vertical direction, and a chuck means which pulls out from said clamping means a specified length of the cut tip of said jacketed optical fiber held by said clamping means and which also transfers said jacketed optical fiber to the third holder in cooperation with said clamping means.

10. The automatic optical measuring apparatus for optical fibers according to claim 1, wherein said controlling unit is comprised of an electronic controlling unit designed to electronically control the operation of each of said component units.

* * * * *